(12) United States Patent
Wang

(10) Patent No.: US 11,189,867 B2
(45) Date of Patent: Nov. 30, 2021

(54) BATTERY PACKS WITH INTEGRATED COLD PLATES FOR ELECTRIC VEHICLES

(71) Applicant: CHONGQING JINKANG POWERTRAIN NEW ENERGY CO., LTD., Chongqing (CN)

(72) Inventor: Jiaxian Wang, Santa Clara, CA (US)

(73) Assignee: CHONGQING JINKANG POWERTRAIN NEW ENERGY CO., LTD., Chongqing (CN)

( * ) Notice: Subject to any disclaimer, the term of this patent is extended or adjusted under 35 U.S.C. 154(b) by 154 days.

(21) Appl. No.: 16/193,677

(22) Filed: Nov. 16, 2018

(65) Prior Publication Data

US 2020/0161728 A1    May 21, 2020

(51) Int. Cl.
| | | |
|---|---|---|
| *H01M 10/6556* | (2014.01) | |
| *H01M 10/6554* | (2014.01) | |
| *H01M 10/625* | (2014.01) | |
| *H01M 10/613* | (2014.01) | |
| *B60L 58/26* | (2019.01) | |
| *B60L 50/64* | (2019.01) | |
| *H01M 50/20* | (2021.01) | |

(52) U.S. Cl.
CPC ......... *H01M 10/6556* (2015.04); *B60L 50/64* (2019.02); *B60L 58/26* (2019.02); *H01M 10/613* (2015.04); *H01M 10/625* (2015.04); *H01M 10/6554* (2015.04); *H01M 50/20* (2021.01)

(58) Field of Classification Search
CPC ......... H01M 10/6556; H01M 10/6554; H01M 10/613; H01M 10/6567; B60L 58/26; F28D 1/035; F28F 3/12; F28F 9/0246
See application file for complete search history.

(56) References Cited

U.S. PATENT DOCUMENTS

| | | | | |
|---|---|---|---|---|
| 2015/0079442 | A1* | 3/2015 | Haussmann | F28F 9/026 429/120 |
| 2016/0268657 | A1* | 9/2016 | Park | H01M 10/613 |
| 2017/0324132 | A1* | 11/2017 | Kenney | F28F 3/046 |

* cited by examiner

*Primary Examiner* — Maria Laios
(74) *Attorney, Agent, or Firm* — Cooper Legal Group, LLC

(57) ABSTRACT

Apparatuses, systems, and methods of providing electric power to components in electric vehicles are detailed herein. A housing can have a bottom panel and side walls defining a cavity. The bottom panel can define an inlet port and an outlet port. A battery module can be disposed within the cavity. A support structure can be on one side wall. The support structure can have a conduit to pass coolant through the housing. A cold plate can be disposed within the cavity and thermally coupled with the battery module. The cold plate can have an inlet, an outlet, and a channel to circulate the coolant from the inlet to the outlet. A distribution plate can be disposed along a bottom surface of the bottom panel. The distribution plate can have a main channel to convey the coolant from the conduit to the cold plate.

20 Claims, 19 Drawing Sheets

BATTERY PACKS WITH INTEGRATED COLD PLATES FOR ELECTRIC VEHICLES

BACKGROUND

There is an increasing demand for reliable and higher capacity battery cells for high power, higher performance battery packs, to support applications in plug-in hybrid electrical vehicles (PHEVs), hybrid electrical vehicles (HEVs), or electrical vehicle (EV) systems, for example. The temperature of battery pack modules can increase under operating conditions.

SUMMARY

The present disclosure is directed to battery packs in electric vehicle. A battery pack can have a cold plate integrated along a bottom plate of the battery pack to transfer heat away from a battery module housed in the battery pack using a coolant. Such a configuration allows for improvement in integrity of the battery pack by lowering a risk of coolant leakage.

At least one aspect is directed to an apparatus to provide electric power to components in electric vehicles. The apparatus can include a housing for a battery pack disposed in an electric vehicle to power the electric vehicle. The housing can have a bottom panel, a first side wall, and a second wall partially defining a cavity within the housing. The bottom panel can have a top surface and a bottom surface. The bottom panel can define an inlet port and an outlet port each through the top surface and the bottom surface. The inlet port can be at an inlet port offset distance from the first side wall. The outlet port can be at an outlet port offset distance from the first side wall. The inlet port offset distance can be different from the outlet port offset distance relative to the first side wall. The apparatus can include a battery module disposed within the cavity of the housing for the battery pack and supported by at least a portion of the top surface of the bottom panel. The battery module can have a plurality of battery cells to store electric energy. The apparatus can include a support structure situated on the second side wall. The support structure can have conduit to pass coolant through the housing. The conduit can have a length less than a length of the second side wall on which the support structure is situated. The apparatus can include a cold plate disposed within the cavity of the housing, mechanically coupled with the top surface of the bottom panel, and thermally coupled with the battery module. The cold plate can have a cold plate inlet coupled with the inlet port to receive the coolant from the conduit, a cold plate outlet coupled with the outlet port to release the coolant from the cold plate, and a channel spanning through the cold plate to circulate the coolant from the cold plate inlet to the cold plate outlet to transfer heat away from the battery module. The cold plate inlet can be at an inlet offset distance from the first side wall. The cold plate outlet can be at an outlet offset distance from the first side wall. The inlet offset distance can be different from the outlet offset distance relative to the first side wall. The apparatus can include a distribution plate disposed along the bottom surface of the bottom panel. The distribution plate can have a main channel to convey the coolant from the conduit to the cold plate via the inlet port of the bottom panel and the cold plate inlet.

At least one aspect is directed to an electric vehicle. The electric vehicle can have one or more components. The electric vehicle can include a housing for a battery pack to power the one or more components. The housing can have a bottom panel, a first side wall, and a second wall partially defining a cavity within the housing. The bottom panel can have a top surface and a bottom surface. The bottom panel can define an inlet port and an outlet port each through the top surface and the bottom surface. The inlet port can be at an inlet port offset distance from the first side wall. The outlet port can be at an outlet port offset distance from the first side wall. The inlet port offset distance can be different from the outlet port offset distance relative to the first side wall. The electric vehicle can include a battery module disposed within the cavity of the housing for the battery pack and supported by at least a portion of the top surface of the bottom panel. The battery module can have a plurality of battery cells to store electric energy. The electric vehicle can include a support structure situated on the second side wall. The support structure can have conduit to pass coolant through the housing. The conduit can have a length less than a length of the second side wall on which the support structure is situated. The electric vehicle can include a cold plate disposed within the cavity of the housing, mechanically coupled with the top surface of the bottom panel, and thermally coupled with the battery module. The cold plate can have a cold plate inlet coupled with the inlet port to receive the coolant from the conduit, a cold plate outlet coupled with the outlet port to release the coolant from the cold plate, and a channel spanning through the cold plate to circulate the coolant from the cold plate inlet to the cold plate outlet to transfer heat away from the battery module. The cold plate inlet can be at an inlet offset distance from the first side wall. The cold plate outlet can be at an outlet offset distance from the first side wall. The inlet offset distance can be different from the outlet offset distance relative to the first side wall. The electric vehicle can include a distribution plate disposed along the bottom surface of the bottom panel. The distribution plate can have a main channel to convey the coolant from the conduit to the cold plate via the inlet port of the bottom panel and the cold plate inlet.

At least one aspect is directed to a method of providing electric power to components in electric vehicles. The method can include disposing a housing for a battery pack disposed in an electric vehicle to power the electric vehicle. The housing can have a bottom panel, a first side wall, and a second wall partially defining a cavity within the housing. The bottom panel can have a top surface and a bottom surface. The bottom panel can define an inlet port and an outlet port through the top surface and the bottom surface. The inlet port can be at an inlet port offset distance from the first side wall. The outlet port can be at an outlet port offset distance from the first side wall. The inlet port offset distance can be different from the outlet port offset distance relative to the first side wall. The method can include arranging a battery module within the cavity of the housing for the battery pack. The battery module can be supported by at least a portion of the top surface of the bottom panel. The battery module can have a plurality of battery cells to store electric energy. The method can include situating a support structure on the second wall. The support structure can have a conduit to pass coolant through the housing. The conduit can have a length less than a length of the second side wall on which the support structure is situated. The method can include disposing a cold plate within the cavity of the housing. The cold plate can be mechanically coupled with the top surface of the bottom panel and thermally coupled with the battery module. The cold plate can have a cold plate inlet coupled with the inlet port to receive the coolant from the conduit, a cold plate outlet coupled with the outlet port to release the coolant from the cold plate, and a channel spanning through the cold plate to circulate the coolant from the cold plate inlet to the cold plate outlet to transfer heat away from the battery module. The cold plate inlet can be at an inlet offset distance from the first side wall. The cold plate outlet can be at an outlet offset distance from the first side wall. The inlet offset distance can be different from the outlet offset distance relative to the first side wall. The method can include arranging a distribution plate along the bottom surface of the bottom panel. The distribution plate can have a main channel to convey the coolant from the conduit to the cold plate via the inlet port of the bottom panel and the cold plate inlet.

At least one aspect is directed toward a method. The method can include providing a battery pack disposed in an electric vehicle to power the electric vehicle. The battery pack can include a housing. The housing can have a bottom panel, a first side wall, and a second wall partially defining a cavity within the housing. The bottom panel can have a top surface and a bottom surface. The bottom panel can define an inlet port and an outlet port each through the top surface and the bottom surface. The inlet port can be at an inlet port offset distance from the first side wall. The outlet port can be at an outlet port offset distance from the first side wall. The inlet port offset distance can be different from the outlet port offset distance relative to the first side wall. The battery pack can include a battery module disposed within the cavity of the housing and supported by at least a portion of the top surface of the bottom panel. The battery module can have a plurality of battery cells to store electric energy. The battery pack can include a support structure situated on the second side wall. The support structure can have conduit to pass coolant through the housing. The conduit can have a length less than a length of the second side wall on which the support structure is situated. The battery pack can include a cold plate disposed within the cavity of the housing, mechanically coupled with the top surface of the bottom panel, and thermally coupled with the battery module. The cold plate can have a cold plate inlet coupled with the inlet port to receive the coolant from the conduit, a cold plate outlet coupled with the outlet port to release the coolant from the cold plate, and a channel spanning through the cold plate to circulate the coolant from the cold plate inlet to the cold plate outlet to transfer heat away from the battery module. The cold plate inlet can be at an inlet offset distance from the first side wall. The cold plate outlet can be at an outlet offset distance from the first side wall. The inlet offset distance can be different from the outlet offset distance relative to the first side wall. The battery pack can include a distribution plate disposed along the bottom surface of the bottom panel. The distribution plate can have a main channel to convey the coolant from the conduit to the cold plate via the inlet port of the bottom panel and the cold plate inlet.

BRIEF DESCRIPTION OF THE DRAWINGS

The accompanying drawings are not necessarily intended to be drawn to scale. Like reference numbers and designations in the various drawings indicate like elements. For purposes of clarity, not every component may be labelled in every drawing. In the drawings.

DETAILED DESCRIPTION

Figure 1:
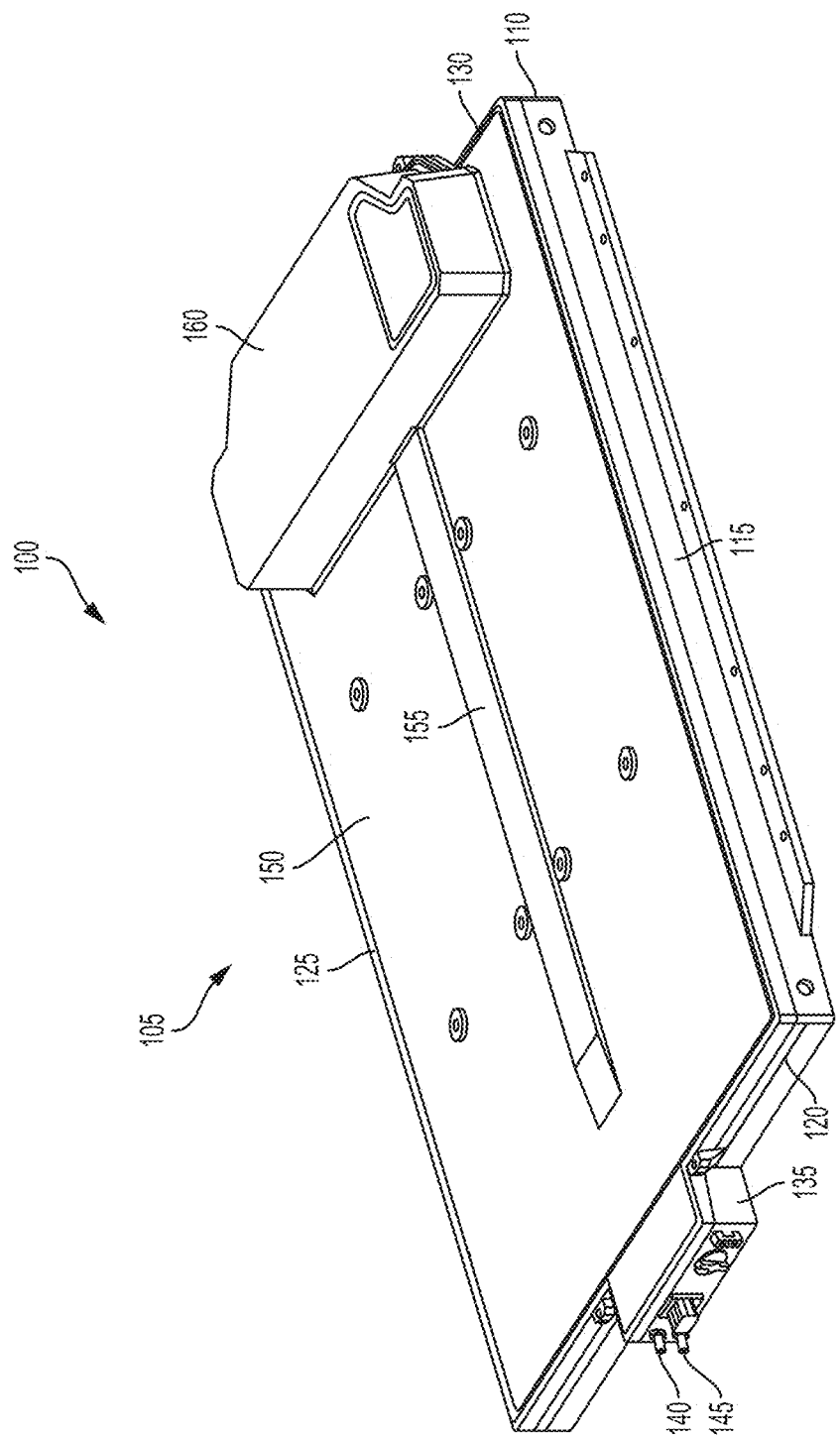
FIG. 1 depicts an isometric view of a topside of an example apparatus for powering electric vehicles.

Following below are more detailed descriptions of various concepts related to, and implementations of, methods, apparatuses, devices, and systems of temperature control for a battery pack or other energy storage device. The various concepts introduced above and discussed in greater detail below may be implemented in any of numerous ways.

Described herein battery packs with integrated cold plates in electric vehicles for an automotive configuration. An automotive configuration includes a configuration, arrangement or network of electrical, electronic, mechanical or electromechanical devices within a vehicle of any type. An automotive configuration can include battery cells for battery packs in electric vehicles (EVs). EVs can include electric automobiles, cars, motorcycles, scooters, passenger vehicles, passenger or commercial trucks, and other vehicles such as sea or air transport vehicles, planes, helicopters, submarines, boats, or drones. EVs can be fully autonomous, partially autonomous, or unmanned. EVs can include various components that run on electrical power. These various components can include an electric engine, an entertainment system (e.g., a radio, display screen, and sound system), on-board diagnostics system, and electric control units (ECUs) (e.g., an engine control module, a transmission control module, a brake control module, and a body control module), among other components.

A battery pack housing a set of battery blocks (sometimes referred herein as battery modules) containing battery cells can be installed in an EV to supply electrical power to the components of the EV. When maintained in an optimal temperature-controlled environment, the battery blocks of the battery pack can achieve proper operation, high-performance, and long life. Under one approach to control the temperature of the battery blocks in the battery pack, at least two sets of pipes may be included in and around each battery block of the battery pack to circulate and evacuate the coolant. An intake pipe can receive coolant from outside the battery pack. An outtake pipe can be connected to the intake pipe via a return, and can release the coolant from the battery pack. These sets of pipes can be comprised of multiple segments, each connected to another via seals or joints. By passing the coolant through the sets pipes, heat may be transferred away from the battery blocks, thereby reducing the temperature.

While this approach can maintain the battery pack in an optimal temperature-controlled environment, there may be a number of technical drawbacks with this schema. The leakage of coolant from the pipes can cause a short circuit or a failure (e.g., fire or explosion) within the battery pack, especially when the coolant enters into the battery blocks containing the battery cells. To avoid leakage of coolant into the battery blocks within the battery pack, the pipes can be sealed around the connections between each segment. With the number of joints connecting the various segments of the pipes, however, prevent such leakage can become difficult and the risk of coolant leakage can be significantly increased. In addition, as the pipes deteriorates from aging and use, the likelihood of rupture of the joints or seals connecting the segments of the pipes can increase, by thereby further amplifying the risk of leakage.

To alleviate and address the technical problems in this approach in evacuating heat from battery packs, the installation of pipes within the battery pack can be minimized or eliminated with the integration of cold plates with channels into the battery pack. The set of the cold plates can be arranged along a top surface of a bottom plate of the battery pack. Each cold plate can be thermally coupled with one of the battery blocks disposed within the battery pack. Each cold plate can have an inlet to receive the coolant into the cold plate, an outlet to drain the coolant from the cold plate, and a channel spanning within and throughout a body of the cold plate from the inlet to the outlet to circulate the coolant. Since the cold plate may be a monolithic structure, the channel can be formed as a single, hollow circuitous path through the structure of the cold plate. As such, the channel can lack any segments or seals or joints between segments as with the approach using the pipes.

To distribute the coolant from outside the battery pack, a distribution plate can be arranged on a bottom surface of the bottom plate of the battery pack extending from one side to the opposite side. The distribution plate can include an intake conduit to receive the coolant from outside the battery pack and an outtake conduit to release the coolant from the battery pack. Both the intake conduit and the outtake conduit can be a trench defined along a surface of the distribution plate forming a fluid conveyance along the bottom surface of the bottom plate. The inlet of each cold plate can be aligned over the intake conduit to receive the coolant from the distribution plate. The outlet of each cold plate can be aligned over the outtake conduit to release the coolant onto the distribution plate. The intake conduit in turn can be fluidly coupled with an inlet for the battery pack to receive the coolant from outside via one side of the battery pack. The outtake conduit can be fluidly coupled with an outlet for the battery pack to release the coolant from the same side of the battery pack. The fluid coupling between the conduits of the distribution plate and the inlets and outlets for the battery pack can each include two respective pipes along the same side outside the interior of the battery pack.

In this manner, the utilization of pipes can be confined to the side that the conduits of the distribution plate and the inlets and outlets for the battery pack are fluidly coupled. As a result, any deleterious effect of coolant leakage from the pipe can be external to the battery pack. By limiting the usage of pipes from the battery pack, the likelihood of rupture of the joints or seals connecting the segments of the pipes can be reduced or eliminated. In addition, the risk of leakage of coolant into the battery cells of the battery blocks can be decreased. Moreover, even if the pipes degrade from usage and again, replacement of the pipes can be less difficult, as the pipes can be placed external to the battery pack.

FIG. 1, among others, depicts an isometric view of a topside of a system or an apparatus 100 for powering electric vehicles. The apparatus 100 can be installed or included in an electric vehicle. The apparatus can include a battery pack 105. The battery pack 105 can store electrical energy to supply electrical energy to components in the electric vehicle electrically coupled with the battery pack 105. The battery pack 105 can include a positive terminal and a negative terminal to electrically couple with the various components of the electric vehicle. The battery pack 105 can include a housing 110. The housing 110 can be comprised of a thermally conductive material. The thermally conductive material for the housing 110 can include a ceramic material (e.g., silicon nitride, silicon carbide, titanium carbide, zirconium dioxide, and beryllium oxide), a metal (e.g., aluminum, copper, iron, tin, lead, and various alloys), and a thermoplastic material (e.g., acrylic glass, polyethylene, polypropylene, polystyrene, or polyvinyl chloride), among others. The housing 110 for the battery pack 105 can be of various shapes. The housing 110 can be prism with a polygonal base, such as a triangle, a square, a rectangular (e.g., as depicted), a pentagon, or a hexagon, among others. The housing 110 can be a cylinder with a circular, ovular, or elliptical base, among others. A length of the housing 110 can range between 1835 mm to 2035 mm. A width of the housing 110 can range between 1270 mm to 1470 mm. A height of the housing 110 can range between 93 mm to 133 mm.

The housing 110 can have at least two longitudinal sides for top and bottom and one or more lateral sides between the at least two longitudinal sides. In a rectangular prism example as depicted, the housing 110 can include a first side wall 115, a second side wall 120, a third side wall 125, and a fourth side wall 130. The first side wall 115 and the third side wall 125 can be opposite of each other, and can each correspond to a width of the housing 110. The width of the housing 110 can range between 1270 mm to 1470 mm. The second side wall 120 and the fourth side wall 130 can be opposite of each other, and can each correspond to a length of the housing 110. The length of the housing 110 can range between 1835 mm to 2035 mm. A height of the first side wall 115, the second side wall 120, the third side wall 125, and the fourth side 130 can correspond to a height of the housing 110, and can each range between 93 mm to 133 mm.

Along at least one of the lateral sides (e.g., the second side wall 120 as depicted) of the housing 110 for the battery pack 105, the apparatus 100 can include a support structure 135 situated thereupon. The support structure 135 can be arranged, situated, or otherwise included on an external surface of at least one of the lateral sides (e.g., the second side wall 120) of the housing 110. The support structure 135 can at least partially span the at least one lateral side of the housing 110 along an interior or an exterior (e.g., as depicted) of the housing 110. A length of the support structure 135 along the at least one lateral side of the housing 110 can be less than a length of one of the lateral sides (e.g., the second side wall 120). The length of the support structure 135 along the lateral side of the housing 110 can range between 83 mm to 123 mm. For example, as illustrated, the support structure 135 can be situated to the second side wall 120 of the housing 110, and can span a portion of the external surface of the second side wall 120. The support structure 135 can extend or protrude from the at least one lateral side of the housing 110 on the exterior (e.g., as depicted). The support structure 135 can be arranged on the at least one lateral side of the housing 110 within the interior of the housing 110. A width of the support structure 135 extending along the exterior or within the interior of the housing 110 can range between 83 mm to 123 mm. A height of the support structure 135 can correspond to the height of the housing 110, and can range between 83 mm to 123 mm.

The support structure 135 can define or include at least one inlet 140 and at least one outlet 145 along at least one lateral side of the support structure to circulate coolant through the housing 110 for the battery pack 105. The inlet 140 and the outlet 145 each can include an aperture or a hole along at least one lateral surface the support structure 135. The coolant can include, for example, water, antifreeze, polyalkylene glycol, liquid nitrogen, hydrofluorocarbons (HFCs), and perfluorocarbons (PFCs), among others. The inlet 140 and the outlet 145 each can be of any shape, and can be triangular, rectangular, polygonal, circular, elliptical, among others. The inlet 140 and the outlet 145 can each have a length ranging between 20 mm to 40 mm. The inlet 140 and the outlet 145 can each have a width ranging between 20 mm to 40 mm.

The inlet 140 can obtain or receive the coolant from outside the housing 110 of the battery pack 105. The inlet 140 can be fluidly coupled (e.g., using a pipe) with a source external to the housing 110 to receive the coolant. The source can include a fluid tank containing or holding the coolant. The inlet 140 can be fluidly coupled with the external source via a pressure regulator. The pressure regulator can control an intake flow rate of the coolant fed into the housing 110 for the battery pack 105 via the inlet 140. The pressure regulator can include a loading element to apply pressure to the coolant fed into the housing 110 via the inlet 140. The inlet 140 itself can also include an inlet control valve to control the intake flow rate on the inlet 140 of the support structure 135. The inlet control valve of the inlet 140 can include an actuator and a restrictive member controlled by the actuator to set the intake flow rate. The outlet 145 can release or drain the coolant from the housing 110 of the battery pack 105. The outlet 145 can be fluidly coupled (e.g., using a pipe) with a disposal external to the housing 110 to receive the coolant. The disposal can include a fluid tank containing or holding the coolant, and can be the same fluid tank as the source feeding the coolant to the housing 110 via the inlet 140. The outlet 145 can be fluidly coupled with the external source via a pressure regulator. The pressure regulator can control an outtake flow rate of the coolant released from the housing 110 for the battery pack 105 via the outlet 145. The pressure regulator can include a loading element to apply pressure to the coolant drained from the housing 110 via the outlet 145. The outlet 145 itself can also include an outlet control valve to control the outtake flow rate on the outlet 145 of the support structure 135. The outlet control valve of the outlet 145 can include an actuator and a restrictive member controlled by the actuator to set the outtake flow rate.

Along the top longitudinal side of the housing 110, the apparatus 100 can include a lid structure 150. The lid structure 150 can be arranged on the top longitudinal side of the housing 110 in a spacing defined within the first side wall 115, the second side wall 120, the third side wall 125, and the fourth side wall 130 of the housing 110. The lid structure 150 can be comprised of a thermally conductive material. The thermally conductive material for the lid structure 150 can include a ceramic material (e.g., silicon nitride, silicon carbide, titanium carbide, zirconium dioxide, and beryllium oxide) and a thermoplastic material (e.g., acrylic glass, polyethylene, polypropylene, polystyrene, or polyvinyl chloride), among others. A length of the lid structure 150 can range between 1871 mm to 2071 mm. A width of the lid structure 150 can range between 1300 mm to 1500 mm. A height of the lid structure 150 can range between 17 mm to 37 mm.

The lid structure 150 can include a module current collector 155 and a terminal port structure 160. The module current collector 155 can span along a top surface of the lid structure 150 (e.g., as depicted). The module current collector 155 can house or include a set of conductive lines to convey electrical power from the battery pack 105 to the components of the electrical vehicle. The set of conductive lines of the module current collector 155 can include at least one positive terminal conductive line and at least one negative terminal conductive line. The set of conductive lines can be comprised of electrically conductive material. The electrically conductive material can include as aluminum, an aluminum alloy with copper, silicon, tin, magnesium, manganese or zinc (e.g., of the aluminum 1000, 4000, or 5000 series), iron, an iron-carbon alloy (e.g., steel), silver, nickel, copper, and a copper alloy, among others. The module current collector 155 can protrude from the top surface of the lid structure 150 (e.g., as depicted) or can be embedded within the lid structure 150. The terminal port structure 160 can be arranged or included along the top surface of the lid structure 150 and can protrude from the top surface of the top surface of the lid structure 150 (e.g., as depicted). The terminal port structure 160 can define or include at least one positive terminal port for the positive terminal and at least one negative terminal port for the negative terminal of the battery pack 105. The positive terminal port of the terminal port structure 160 can be electrically coupled with the positive terminal conductive line of the module current collector 155. The negative terminal port of the terminal port structure 160 can be electrically coupled with the negative terminal conductive line of the module current collector 155.

Figure 2:
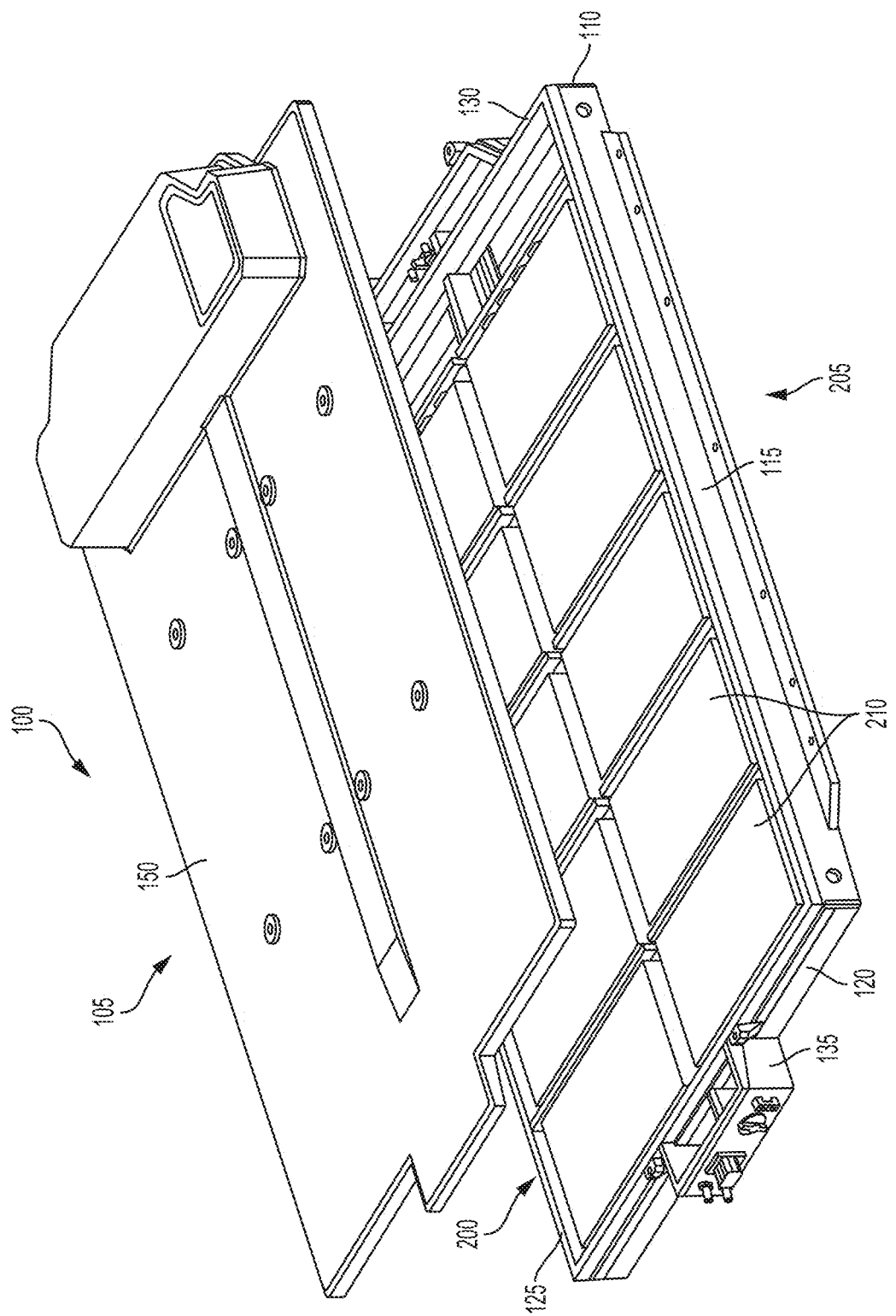
FIG. 2 depicts a partially exploded, axonometric view of a topside of an example apparatus with battery packs arranged in a cavity of the battery pack.
Figure 3:
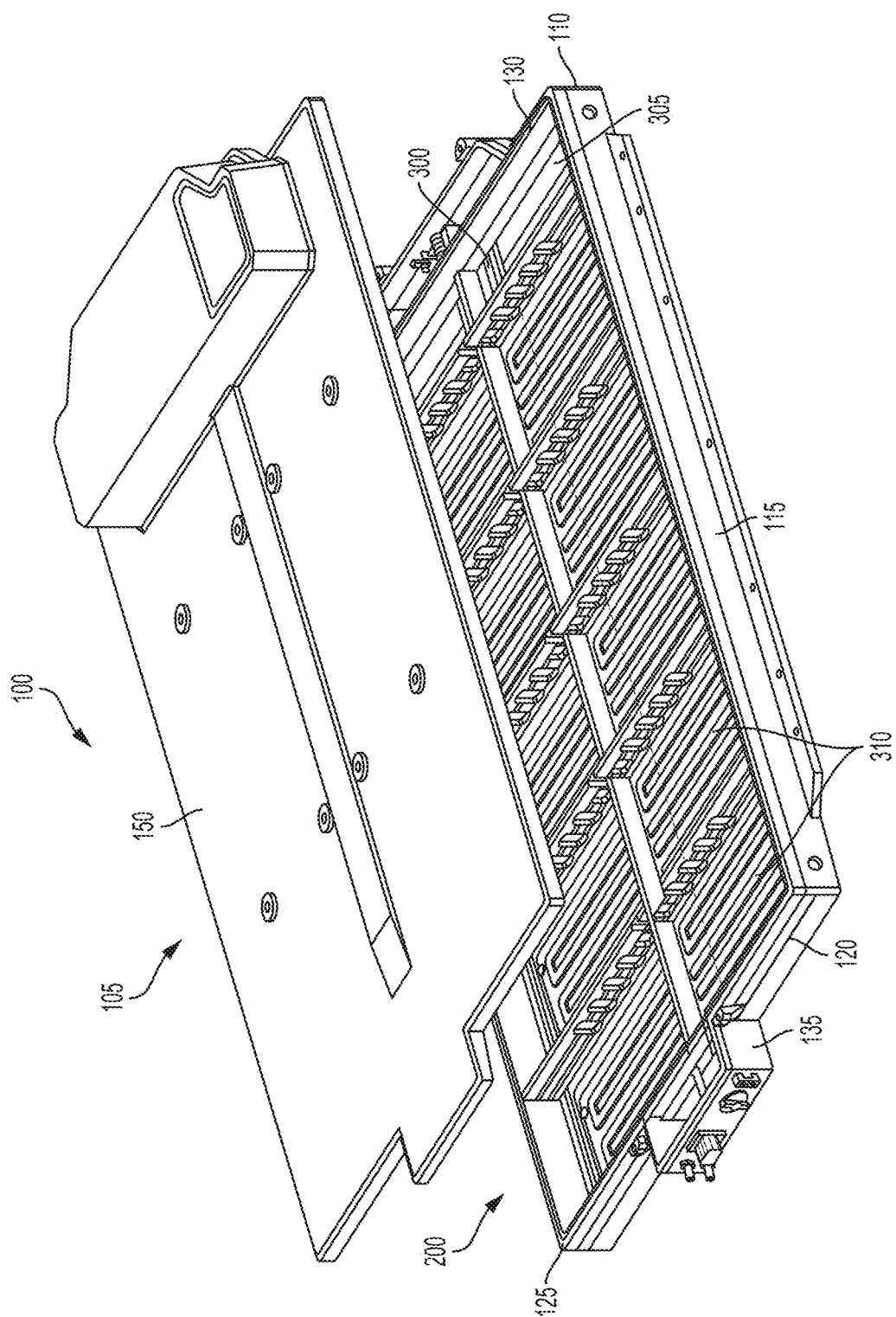
FIG. 3 depicts a partially exploded, axonometric view of a topside of an example apparatus with cold plates disposed in a cavity of the battery pack.

FIGS. 2 and 3, among others, each depict a partially exploded, axonometric view of a topside of the apparatus 100. As illustrated, the housing 110 for the battery pack 105 can define or include at least one cavity 200 within the interior and along a bottom panel 205 of the housing 110. The bottom panel 205 can correspond to the bottom longitudinal side of the housing 110 for the battery pack 105. The bottom panel 205 can include one or more structures to cover the bottom longitudinal side of the housing 110 for the battery pack 105. The bottom panel 205 can have a top surface and a bottom surface to form the bottom longitudinal side of the housing 110. At least a portion of the top surface of the bottom panel 205 can face an interior of the housing 110 in defining the cavity 200. At least a portion of the bottom panel 205 can correspond to an exterior of the housing 110 along the bottom longitudinal side. A shape of the bottom panel 205 can correspond to a base of the shape of the housing 110. The shape of the bottom panel 205 can be a triangle, a square, a rectangular (e.g., as depicted), a pentagon, a hexagon, a circle, or an oval, among others. A length of the bottom panel 205 can range between 1807 mm to 1827 mm. A width of the bottom panel 205 can range between 1300 mm to 1500 mm.

The cavity 200 can be defined within the housing 110. The first side wall 115, the second side wall 120, the third side wall 125, the fourth side wall 130, and the bottom panel 205 can form or define the cavity 200 of the housing 110. The cavity 200 can correspond to a hollow volume within the interior of the housing 110, and can extend from the top longitudinal side of the housing 110 to the bottom panel 205 of the housing 110 for the battery pack 105. The lid structure 150 can at least partially cover the cavity 200 within the first side wall 115, the second side wall 120, the third side wall 125, and the fourth side wall 130. The shape and dimensions of the cavity 200 can generally correspond to the shape and dimensions of the housing 110. The shape and dimensions of the cavity 200 can also differ from the shape and dimensions of the housing 110, and the shape can be a prism with a polygonal base, such as a triangle, a square, a rectangular (e.g., as depicted), a pentagon, or a cylinder with a circular, ovular, or elliptical base, among others. A length of the cavity 200 can range between 570 mm to 770 mm. A width of the cavity 200 can range between 236 mm to 436 mm. A height of the cavity 200 can range between 83 mm to 133 mm.

Within the cavity 200 of the housing 110, the apparatus 100 can include a set of battery modules 210 to store electrical energy to power the electric vehicle. Each battery module 210 can be disposed, arranged, or otherwise included in the cavity 200 of the housing 110. The set of battery modules 210 can be arranged in parallel, in series, or both in parallel and in series (e.g., as depicted). The set of battery modules 210 can be supported by at least a portion of the bottom panel 205 of the housing 110. At least a portion of a bottom surface of each battery module 210 can be in contact with a portion of the top surface of the bottom panel 205. At least a portion of the bottom surface of each battery module 210 can be flush with the top surface of the bottom panel 205. The set of battery modules 210 can be situated or arranged above one or more components arranged along the bottom panel 205 of the housing 110. The one or more components can reside between the bottom surface of one of the battery modules 210 and the top surface of the bottom panel 205. The top surface of the bottom panel 205 can thus support the set of battery modules 210 via the one or more components.

Each battery module 210 can support or include a set of battery cells to store electrical energy. Each battery module 210 can define or include one or more holders for the battery cells. Each holder can contain, support, or house at least one battery cell. The battery module 210 can be comprised of a thermally conductive and electrically insulative material. The material of the battery module 210 can include a ceramic material (e.g., silicon nitride, silicon carbide, titanium carbide, zirconium dioxide, and beryllium oxide) and a thermoplastic material (e.g., acrylic glass, polyethylene, polypropylene, polystyrene, or polyvinyl chloride), among others. A shape of the battery module 210 can be a prismatic casing with a polygonal base, such as a triangle, a square, a rectangular (e.g., as depicted), a pentagon, or a hexagon, among others. The shape of the battery module 210 can include a cylindrical casing or cylindrical cell with a circular, ovular, or elliptical base, among others. A height of each battery module 210 can be 72 mm to 112 mm. A width or diameter of each battery module 210 can be 310 mm to 350 mm. A length of each battery module 210 can be 630 mm to 670 mm.

The battery cells included in the battery modules 210 can include a lithium-air battery cell, a lithium ion battery cell, a nickel-zinc battery cell, a zinc-bromine battery cell, a zinc-cerium battery cell, a sodium-sulfur battery cell, a molten salt battery cell, a nickel-cadmium battery cell, or a nickel-metal hydride battery cell, among others. Each battery cell in the battery modules 210 can have or define a positive terminal and a negative terminal. Both the positive terminal and the negative terminal can be along a top surface of the battery cell. The shape of the battery cell can be a prismatic casing with a polygonal base, such as a triangle, square, a rectangular, a pentagon, or a hexagon. The shape of the battery cell can also be cylindrical casing or cylindrical cell with a circular (e.g., as depicted), ovular, or elliptical base, among others. A height of each battery cell can range between 50 mm to 90 mm. A width or diameter of each battery cell can range between 16 mm to 26 mm. A length or diameter of each battery cell can range between 16 mm to 26 mm.

The battery module 210 can have or define a positive terminal and a negative terminal. The positive terminal for the battery module 210 can correspond to or can be electrically coupled with the positive terminals of the set of battery cells in the battery module 210. The negative terminal for the battery module 210 can correspond to or can be electrically coupled with the negative terminals of the set of battery cells in the battery module 210. Both the positive terminal and the negative terminal of the battery module 210 can be defined or located along a top surface of the battery module 210 (e.g., as depicted). The positive terminal and the negative terminal of each battery module 210 can be electrically coupled with the set of conductive lines in the module current collector 155 and the terminal ports of the terminal port structure 160 of the lid structure 150. The positive terminal of the battery module 210 can be electrically coupled with the positive polarity port of the terminal port structure 160 via the positive terminal conductive line of the module current collector 155. The negative terminal of the battery module 210 can be electrically coupled with the negative polarity port of the terminal port structure 160 via the negative terminal conductive line of the module current collector 155.

Along the bottom panel 205 of the housing 110, the apparatus 100 can include at least one bottom ridge plate 300. The bottom ridge plate 300 can form or can be part of the bottom panel 205. The bottom ridge plate 300 can be disposed or arranged within the cavity 200 along the bottom panel 205 of the housing 110. The bottom ridge plate 300 can at least partially extend or span from one lateral side to an opposing lateral side along the bottom longitudinal side of the housing 110. For example as depicted, the bottom ridge plate 300 can extend from the first side wall 115 to the third side wall 125. The bottom ridge plate 300 can be separated from one or more lateral sides of the housing 110 to define a spacing between the bottom ridge plate 300 and the one or more lateral walls. For example as illustrated, the bottom ridge plate 300 can be separated from the second side wall 120 and the fourth side wall 130 to define a spacing between the bottom ridge plate 300 and the second side wall 120 and another spacing between the bottom ridge plate 300 and the fourth side wall 130. The bottom ridge plate 300 can also extend or span to all the lateral sides of the housing 110. The bottom ridge plate 300 can support at least one battery module 210 and at least one cold plate 310 disposed or arranged thereon. The bottom ridge plate 300 can be comprised of a thermally conductive material. The material for the bottom ridge plate 300 can include a ceramic material (e.g., silicon nitride, silicon carbide, titanium carbide, zirconium dioxide, and beryllium oxide), a metal (e.g., aluminum, copper, iron, tin, lead, and various alloys), and a thermoplastic material (e.g., acrylic glass, polyethylene, polypropylene, polystyrene, or polyvinyl chloride), among others.

The apparatus 100 can include at least one bottom cover plate 305 along the bottom panel 205 of the housing 110. The bottom cover plate 305 can form or can be part of the bottom panel 205. The bottom cover plate 305 can be disposed or arranged within the cavity 200 along the bottom panel 205 of the housing 110. The bottom cover plate 305 can at least partially extend or span from one lateral side to an opposing lateral side along the bottom longitudinal side of the housing 110. The bottom cover plate 305 can at least partially span along three lateral sides of the housing 110 and the bottom ridge plate 300 along the bottom longitudinal side of the housing 110. Each bottom cover plate 305 can at least partially span the spacing defined between the bottom ridge plate 300 and at least one of the lateral sides of the housing 110. For example as depicted, one bottom cover plate 305 can extend between the first side wall 115 and the third side wall 125 along the second side wall 120, the fourth side wall 130, while another bottom cover plate 305 can extend between the first side wall 115 and the third side wall 125 along the fourth side wall 130. The bottom cover plate 305 can support at least one battery module 210 and at least one cold plate 310 disposed or arranged thereon. The bottom cover plate 305 can be comprised of a thermally conductive material. The material for the bottom cover plate 305 can include a ceramic material (e.g., silicon nitride, silicon carbide, titanium carbide, zirconium dioxide, and beryllium oxide), a metal (e.g., aluminum, copper, iron, tin, lead, and various alloys), and a thermoplastic material (e.g., acrylic glass, polyethylene, polypropylene, polystyrene, or polyvinyl chloride), among others. The bottom cover plate 305 can form or can be part of the bottom ridge plate 300, or vice-versa, to form the bottom panel 205 of the housing 110.

The apparatus 100 can include a set of cold plates 310. Each cold plate 310 can be disposed or arranged within the cavity 200 along the bottom panel 205 of the housing 110. The set of cold plates 310 can be arranged in parallel, in series, or both in parallel and in series (e.g., as depicted). Each cold plate 310 can be mechanically coupled with the bottom panel 205, the bottom ridge plate 300, or the bottom cover plate 305. The set of cold plates 310 can be supported by at least a portion of the bottom panel 205 of the housing 110. At least a portion of a bottom surface of each cold plate 310 can be in contact with a portion of the top surface of the bottom panel 205. At least a portion of the bottom surface of each cold plate 310 can be flush with the top surface of the bottom panel 205. The set of cold plates 310 can be situated or arranged above one or more components arranged along the bottom panel 205 of the housing 110. The one or more components can reside between the bottom surface of one of the cold plates 310 and the top surface of the bottom panel 205. The top surface of the bottom panel 205 can thus support the set of cold plates 310 via the one or more components.

Each cold plate 310 can be thermally coupled with at least one battery module 210. Each cold plate 310 can circulate the coolant received from the inlet 140 of the support structure 135 to transfer heat away from the battery module 210 thermally coupled with the cold plate 310. Each cold plate 310 can be arranged or disposed between the bottom panel 205 and the battery module 210 within the cavity 200 of the housing 110. Each cold plate 310 can be arranged or disposed beneath the battery module 210 within the cavity 200. The top surface of the cold plate 310 can be at least partially in contact or flush with the bottom surface of the battery module 210 thermally coupled with the cold plate 310. The bottom surface of the cold plate 310 can be at least partially in contact or flush with the top surface of the bottom panel 205. The cold plate 310 can be comprised of a thermally conductive material. The material for the cold plate 310 can include a ceramic material (e.g., silicon nitride, silicon carbide, titanium carbide, zirconium dioxide, and beryllium oxide), a metal (e.g., aluminum, copper, iron, tin, lead, and various alloys), and a thermoplastic material (e.g., acrylic glass, polyethylene, polypropylene, polystyrene, or polyvinyl chloride), among others, or any combination thereof. The cold plate 310 can receive the coolant from the inlet 140 of the support structure 135. The cold plate 310 can release the coolant to the outlet 145 of the support structure 135.

Figure 4:
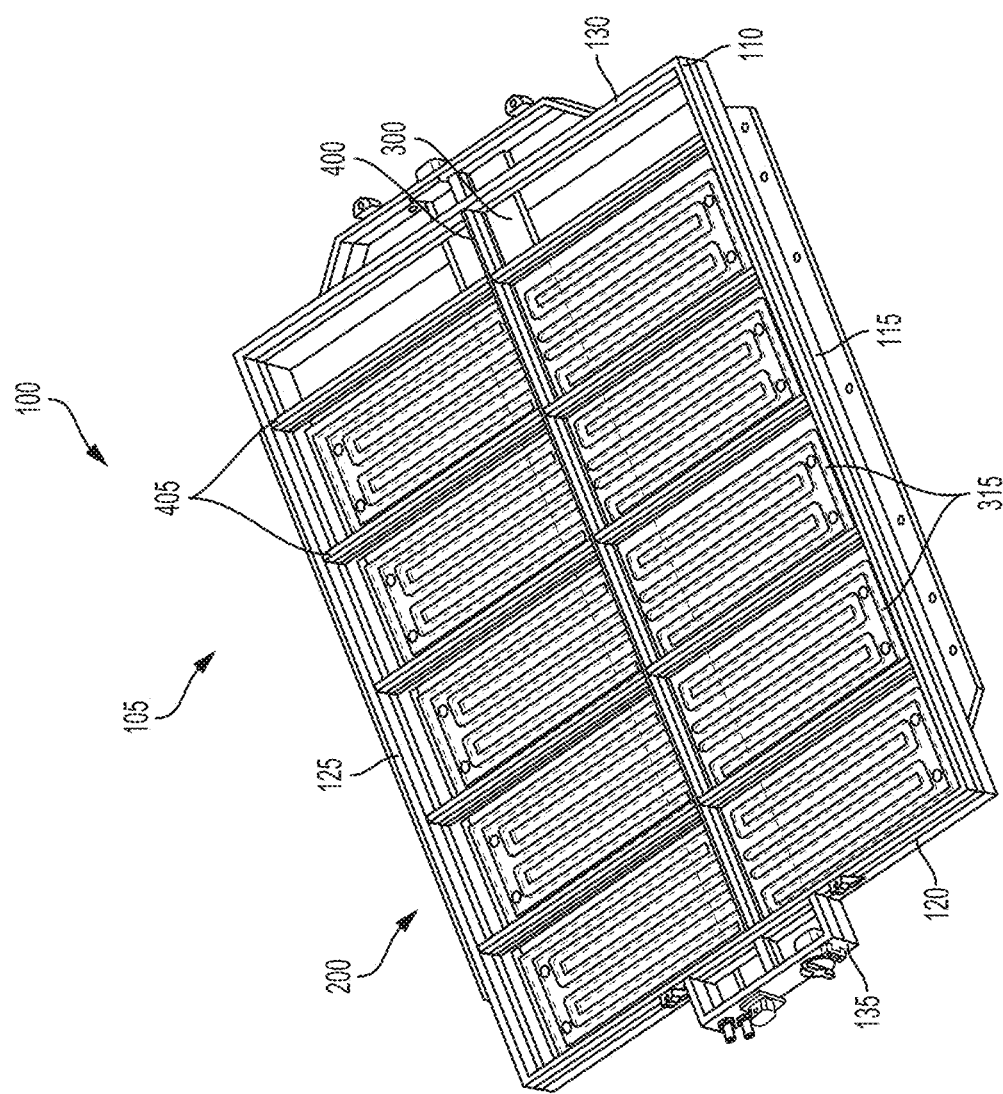
FIG. 4 depicts an isometric view of a cavity of an example apparatus with cold plates disposed in the cavity.
Figure 5:
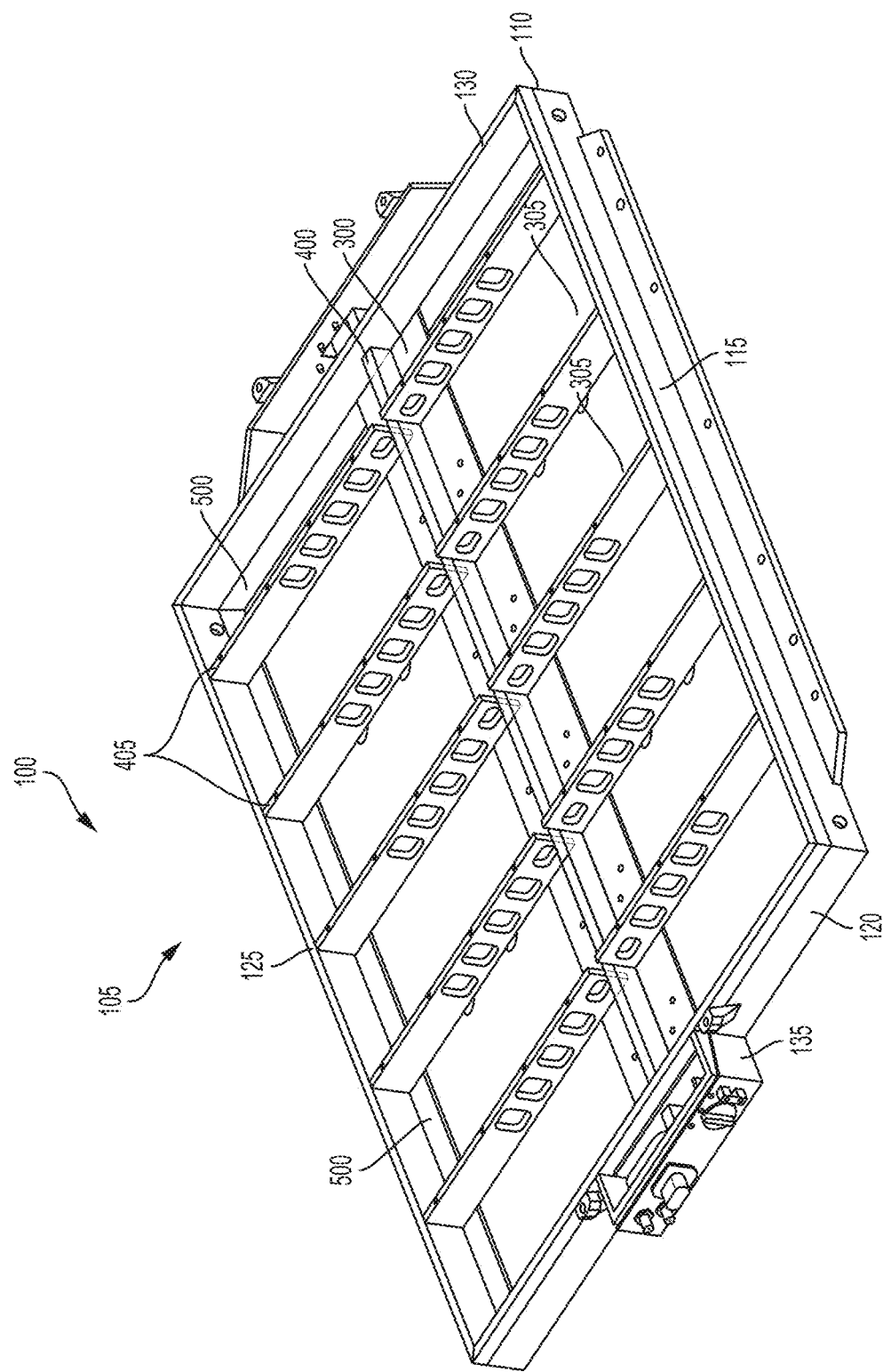
FIG. 5 depicts an isometric view of a cavity of an example apparatus with structural supports of the example battery pack.

FIGS. 4 and 5 each depict an isometric view of the cavity 200 of the apparatus 100. As depicted, the apparatus 100 can include at least one lengthwise divider element 400 (sometimes referred herein as an extrusion structure or more generally as an internal divider element). The lengthwise divider element 400 can divide the cavity 200 along a long side into at least two portions. The lengthwise divider element 400 can at least partially extend from the bottom panel 205 of the housing 110. The lengthwise divider element 400 can extend or span the cavity 200 from the second side wall 120 to the fourth side wall 130. The lengthwise divider element 400 can be substantially orthogonal (e.g., ranging between 85° to 95°) with the second side wall 120 or the fourth side wall 130. The lengthwise divider element 400 can substantially parallel (e.g., deviation of 15%) with the second side wall 120 or the fourth side wall 130. Within the cavity, each portion defined by the lengthwise divider element 400 can contain, house, or otherwise include at least one battery modules 210 and at least cold plate 310, among others. For example as depicted, the lengthwise divider element 400 can partition the cavity 200 into a left portion and a right portion. The left portion of the cavity 200 can include a subset of battery modules 210 and a subset of cold plates 310. The right portion of the cavity 200 can include a subset of battery modules 210 and a subset of cold plates 310. A lateral surface of the lengthwise divider element 400 can be in contact or flush with a lateral surface of the battery module 210. The lengthwise divider element 400 can form or be part of the bottom ridge plate 300. The lengthwise divider element 400 can be supported by the bottom panel 205 of the housing 110. A length of the lengthwise divider element 400 can be the width of the cavity 200 defined within the housing 110, and can range between 19600 mm to 2400 mm. A height of the lengthwise divider element 400 can be the height of the cavity 200 defined within the housing 110, and can range between 83 mm to 133 mm. A width of the lengthwise divider element 400 can range between 20 mm to 40 mm.

The apparatus 100 can include at least one internal widthwise divider element 405 (sometimes referred herein generally as an internal divider element). The widthwise divider element 405 can divide the cavity 200 along a breadth into at least two portions. The widthwise divider element 405 can divide the cavity 200 along a long side into at least two portions. The widthwise divider element 405 and the lengthwise divider element 400 can partition the cavity 200 into multiple portions. For example as illustrated, the lengthwise divider element 400 along with the widthwise divider element 405 can partition the cavity 200 into twelve portions. Each portion of the cavity 200 defined by the lengthwise divider element 400 and the widthwise divider element 405 can house or contain at least one of the battery modules 210. Each widthwise divider element 405 can be arranged between a lateral surface of one battery module 210 and an opposing lateral surface of another battery module 210. The widthwise divider element 405 can at least partially extend from the bottom panel 205 of the housing 110. The widthwise divider element 405 can extend or span the cavity 200 from the first side wall 115 and the third side wall 125. The widthwise divider element 405 can be substantially orthogonal (e.g., ranging between 85° to 95°) with the first side wall 115 or the third side wall 125. The widthwise divider element 405 can substantially parallel (e.g., deviation of 15%) with the first side wall 115 or the third side wall 125. Within the cavity, each portion defined by the widthwise divider element 405 can contain, house, or otherwise include at least one battery modules 210 and at least cold plate 310, among others. A lateral surface of the widthwise divider element 405 can be in contact or flush with a lateral surface of the battery module 210. The widthwise divider element 405 can be supported by the bottom panel 205 of the housing 110. A length of the widthwise divider element 405 can be the length of the cavity 200 defined within the housing 110, and can range between 650 mm to 690 mm. A height of the widthwise divider element 405 can be the height of the cavity 200 defined within the housing 110, and can range between 67 mm to 117 mm. A width of the widthwise divider element 405 can range between 10 mm to 30 mm.

The apparatus 100 can include at least one abutment structure 500. The abutment structure 500 can be disposed or arranged within the cavity 200 along the bottom panel 205 of the housing 110. The abutment structure 500 can form, can be joined, can be attached, or be a part of the bottom panel 205 along the first side wall 115, the second side wall 120, the third side wall 125, and the fourth side wall 130. The abutment structure 500 can form, can be joined, can be attached, or can be a part of the first side wall 115, the second side wall 120, the third side wall 125, and the fourth side wall 130 along the bottom longitudinal side of the housing 110. The abutment structure 500 can partially extend from the bottom panel 205 of the housing 110. The abutment structure 500 can partially extend into the cavity 200 from at least one of the lateral sides of the housing 110 (e.g., the first side wall 115, the second side wall 120, the third side wall 125, and the fourth side wall 130). The abutment structure 500 can support at least one battery module 210 and at least one cold plate 310 disposed or arranged thereon. The abutment structure 500 can be comprised of a thermally conductive material. The material for the abutment structure 500 can include a ceramic material (e.g., silicon nitride, silicon carbide, titanium carbide, zirconium dioxide, and beryllium oxide), a metal (e.g., aluminum, copper, iron, tin, lead, and various alloys), and a thermoplastic material (e.g., acrylic glass, polyethylene, polypropylene, polystyrene, or polyvinyl chloride), among others, or any combination thereof. Along each lateral side of the housing 110, a length of the abutment structure 500 can range between 1760 mm to 2171 mm. Spanning from each lateral side of the housing 110, a width of the abutment structure 500 can range between 47 mm to 67 mm. A height of the abutment structure 500 extending from the bottom panel 205 can range between 8 mm to 28 mm.

Figure 6:
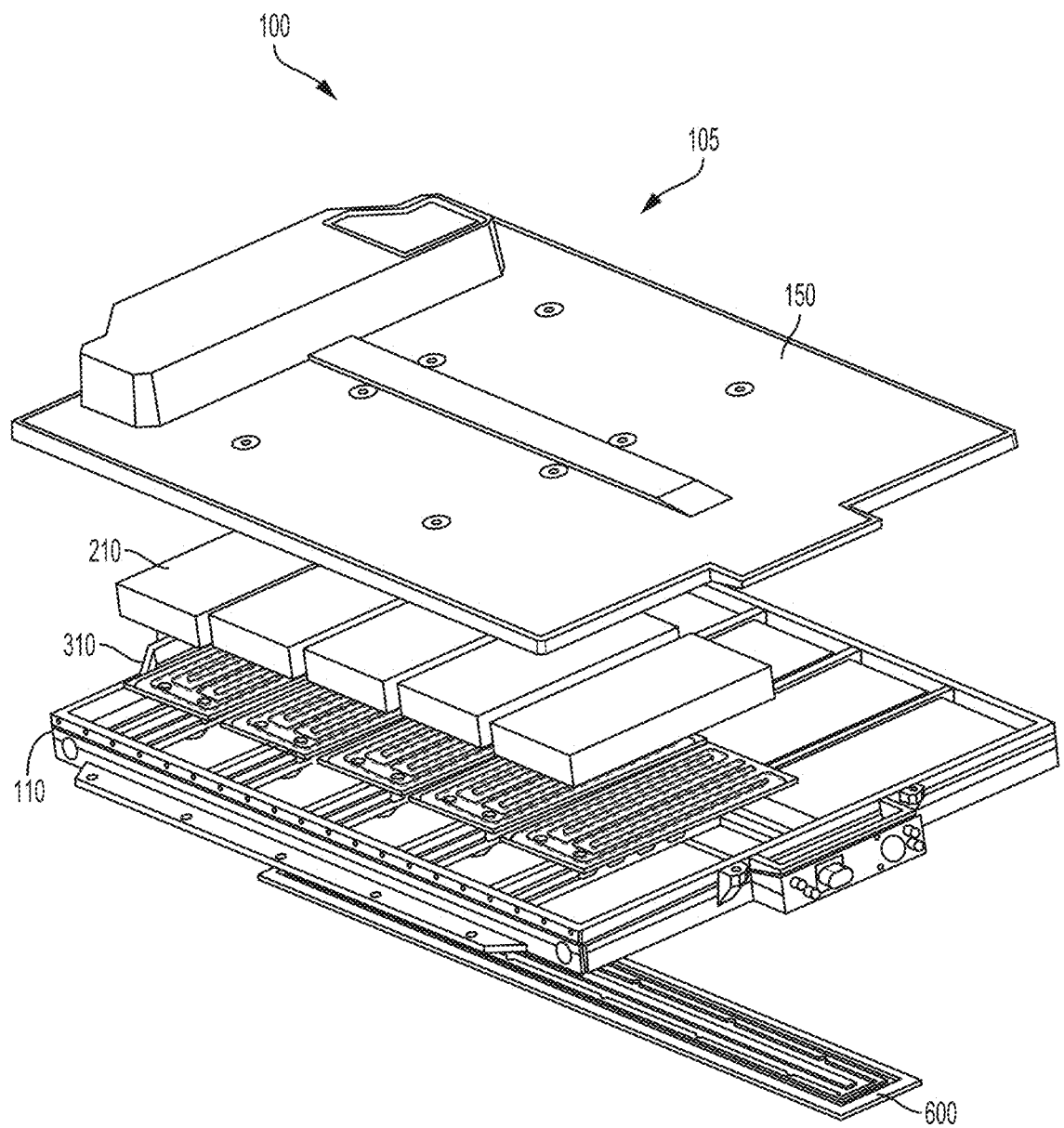
FIG. 6 depicts an exploded axonometric view of an example apparatus for powering electric vehicles.

FIG. 6 depicts an exploded axonometric view of the apparatus 100. As depicted, the apparatus 100 can include the housing 110, the lid structure 150, the set of battery modules 210, and the set of cold plates 310, among other. The apparatus 100 can further include at least one distribution plate 600. The distribution plate 600 can be arranged or disposed along the bottom surface of the bottom panel 205. The distribution plate 600 can be attached, sealed, or otherwise joined to at least a portion of the bottom surface of the bottom panel 205. The distribution plate 600 can be separate from the components of housing 110, such as the first side wall 115, the second side wall 120, the third side wall 125, the fourth side wall 130, the bottom panel 205, the bottom ridge plate 300, the bottom cover plate 305, among others. Disposed along the bottom surface of the bottom panel 205, the distribution plate 600 can at least partially span the bottom surface of the bottom panel 205. For example as shown, the distribution plate 600 can extend along the bottom surface of the bottom panel 205 from the second side wall 120 to the fourth side wall 130.

The distribution plate 600 can define or include a main channel. The main channel of the distribution plate 600 can be fluidly coupled with the inlet 140 and the outlet 145 of the support structure 135 and with each cold plate 310 to convey the coolant from outside the housing 110 to the cold plates 310 disposed in the cavity 200 within the housing 110. The distribution plate 600 can be comprised of a thermally conductive material. The material for the distribution plate 600 can include a ceramic material (e.g., silicon nitride, silicon carbide, titanium carbide, zirconium dioxide, and beryllium oxide), a metal (e.g., aluminum, copper, iron, tin, lead, and various alloys), and a thermoplastic material (e.g., acrylic glass, polyethylene, polypropylene, polystyrene, or polyvinyl chloride), among others, or any combination thereof. The distribution plate 600 can be of any shape, such as a prism with a polygonal base, such as a triangle, a square, a rectangular (e.g., as depicted), a pentagon, or a hexagon, among others. A length of the distribution plate 600 can range between 1960 mm to 2360 mm. A width of the distribution plate 600 can range between 214 mm to 254 mm. A thickness of the distribution plate 600 can range between 3 mm to 23 mm.

Figure 7:
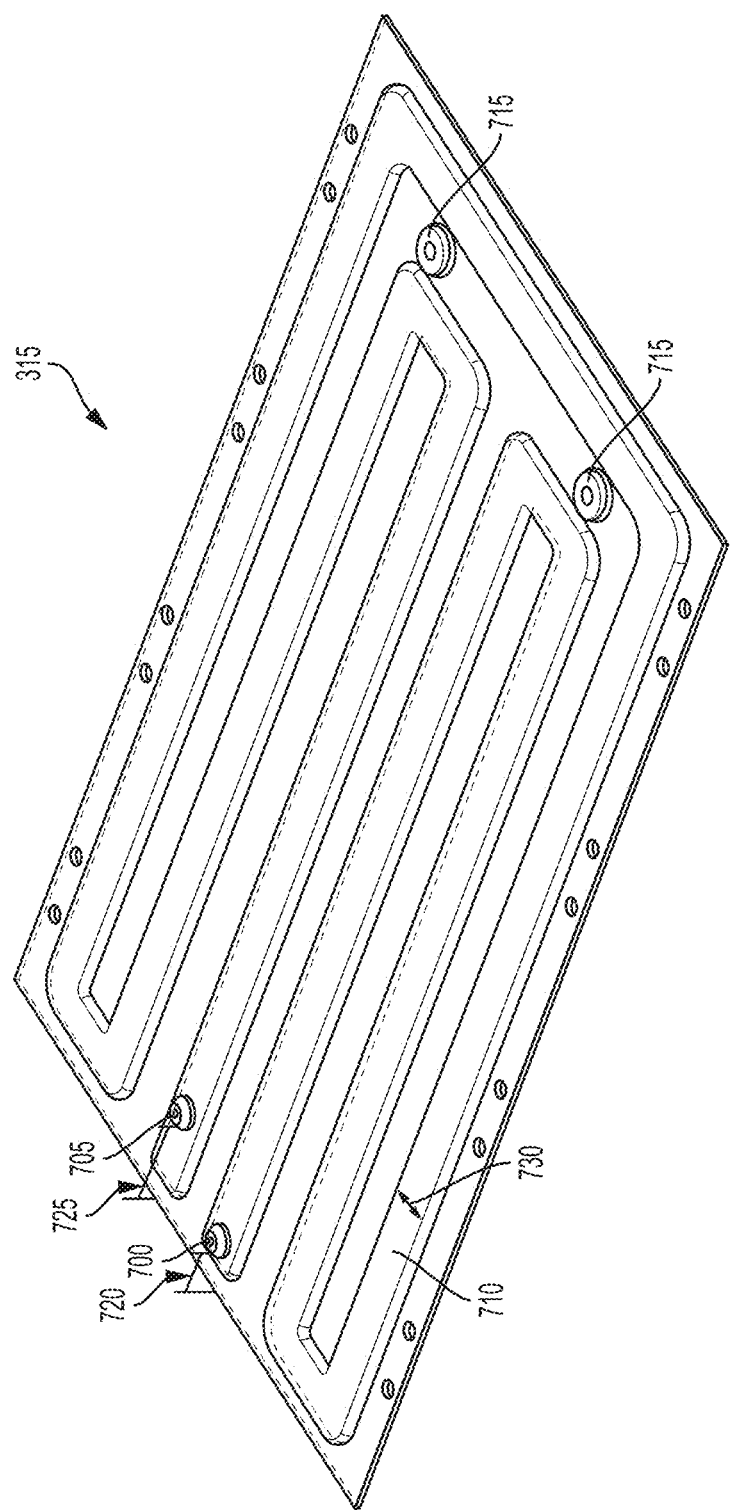
FIG. 7 depicts an isometric view of an example cold plate of a battery pack.

FIG. 7 depicts an isometric view of the cold plate 310 of the apparatus 100. The cold plate 310 can define or include at least one inlet 700 and at least one outlet 705. The inlet 700 and the outlet 705 each can include an aperture or a hole along a longitudinal surface (e.g., a bottom surface) of the cold plate 310. The inlet 700 of the cold plate 310 can be fluidly coupled with the inlet 140 of the support structure 135 via the distribution plate 600. The inlet 700 of the cold plate 310 can receive the coolant from the inlet 140 of the support structure 135 conveyed via the distribution plate 600. The outlet 705 of the cold plate 310 can be fluidly coupled with the outlet 145 of the support structure 135 via the distribution plate 600. The outlet 705 of the cold plate 310 can release the coolant to the outlet 145 of the support structure 135 via the distribution plate 600. The inlet 700 and the outlet 705 each can be of any shape, and can be triangular, rectangular, polygonal, circular, elliptical, among others. The inlet 700 and the outlet 705 can each have a length ranging between 3 mm to 9 mm. The inlet 700 and the outlet 705 can each have a width ranging between 5 mm to 10 mm. The inlet 700 and the outlet 705 can be located in one area of the cold plate 310. For example as depicted, the inlet 700 and the outlet 705 can be located along a left center region of the cold plate 310. The inlet 700 and the outlet 705 can be positioned or located at a distance ranging between 30 mm to 70 mm relative to one edge of the cold plate 310. The inlet 700 can have an offset distance 720 (sometimes referred herein as an inlet offset distance) of between 20 mm to 50 mm from the edge of the cold plate 310. The outlet 705 can have an offset distance 725 (sometimes referred herein as an outlet offset distance) of between 40 mm to 80 mm from the edge of the cold plate 310. The offset distance 720 can differ from the offset distance 725, and vice-versa. The offset distance 720 can be less than the offset distance 725 to position the inlet 700 closer to the edge of the cold plate 310 than the outlet 705. The offset distance 720 can be greater than the offset distance 725 to position the outlet 705 closer to the edge of the cold plate 310 than the inlet 700.

The cold plate 310 can define or have at least one channel 710 to circulate the coolant through the cold plate 310. The channel 710 can be formed or defined within the cold plate 310. The channel 710 can span across the cold plate 310 from the inlet 700 to the outlet 705. The channel 710 can circulate the coolant from the inlet 700 to the outlet 705. The channel 710 can receive the coolant from the inlet 700 and can release the coolant via the outlet 705. As the cold plate 310 is thermally coupled with at least one battery module 210, the coolant in the channel 710 can evacuate, remove, or otherwise transfer heat away from the battery module 210. The channel 710 can be a covered, hollow path within the cold plate 310. The channel 710 can be a prismatic hollowing with a triangular, rectangular, pentagonal, elliptical, and circular base, among other shapes. The channel 710 can include an elevated covering for the hollow path spanning the cold plate 310. A top surface of the elevated covering for the channel 710 can be elevated from the remainder of the top surface of the cold plate 310 (e.g., as depicted). The top surface of the channel 710 can be in contact or flush with the bottom surface of the battery module 210. The channel 710 can have a width 730 ranging between 15 mm to 35 mm.

In spanning across the cold plate 310, the channel 710 can meander, traverse, or otherwise be defined starting from about the inlet 700 and terminating about the outlet 705. The hollow path of the channel 710 can be circuitous. The circuitous path for the channel 710 can include, for example, a zigzag pattern (e.g., as depicted in FIG. 7), a spiral shape, a loopy shape, a serpentine shape, among others. The channel 710 can include or can be formed by multiple straight segments. Each segment can correspond to a generally straight portion of the hollow path of channel 710 through the cold plate 310. An end of one segment can be connected with one end of another segment at a substantially orthogonal angle (e.g., between 75° and 105°). The channel 710 can have a straight path along an exterior portion of the cold plate 310 and a tortuous path within an interior portion of the cold plate 310. The exterior portion can generally correspond to the edges defining a perimeter of the cold plate 310. The interior portion can generally correspond to a central region of the cold plate 310. The channel 710 can span along at least three edges along the exterior portion from the inlet 700 to the outlet 705. For example as depicted, the channel 710 can have three straight segments along three of the four edges of the cold plate 310. In this manner, the coolant can spread fairly evenly from the one end of the channel 710 by the inlet 700 to the other end of the channel 710 by the outlet 705, and move through the cold plate 310. By spreading out the coolant, the heat from the battery module 210 thermally coupled with the cold plate 310 can be spread throughout the battery module 210 via the coolant held in the channel 710.

The cold plate 310 can include or define at least one mounting hole 715 to mechanically couple the cold plate 310 to the top surface of the bottom panel 205. Each mounting hole 715 can define an aperture through the cold plate 310 to insert a mounting element to attach, hold, fasten, or otherwise join the cold plate 310 to bottom panel 205 (or the bottom ridge plate 300 or the bottom cover plate 305 forming the bottom panel 205). The aperture can span one side of the cold plate 310 to the opposite side of the cold plate 310. The mounting hole 715 can be at least partially aligned or collinear with a corresponding area of the bottom panel 205 to secure the mounting element. The area of the battery pack 105 can define a hole, aperture or opening to secure the mounting element through the mounting hole 715 to integrate the cold plate 310 onto the battery pack 105. The mounting element (sometimes referred herein as a fastening element) can include, for example, as a screw, a bolt, a clasp, a bucket, a tie, or a clip, among others. By insertion into the mounting hole 715, the mounting element can firmly hold or secure the cold plate 310 onto the top surface of the bottom panel 205. The mounting holes 715 can be of any shape, such as a triangle, a square, a rectangular, a pentagon, or a hexagon, among others. The shape of the mounting holes 715 can also be circular (e.g., as illustrated), ovular, or elliptical, among others. The length of the mounting hole 715 can range between 3 mm to 9 mm. The width or diameter of the mounting hole 715 can range between 3 mm to 30 mm. The shapes and the dimensions can vary among the mounting holes 715 of the cold plate 310. At least a portion of the bottom surface of the cold plate 310 can be held or secured to the top surface of the bottom panel 205 using insert molding, sealing, an adhesive.

Figure 8:
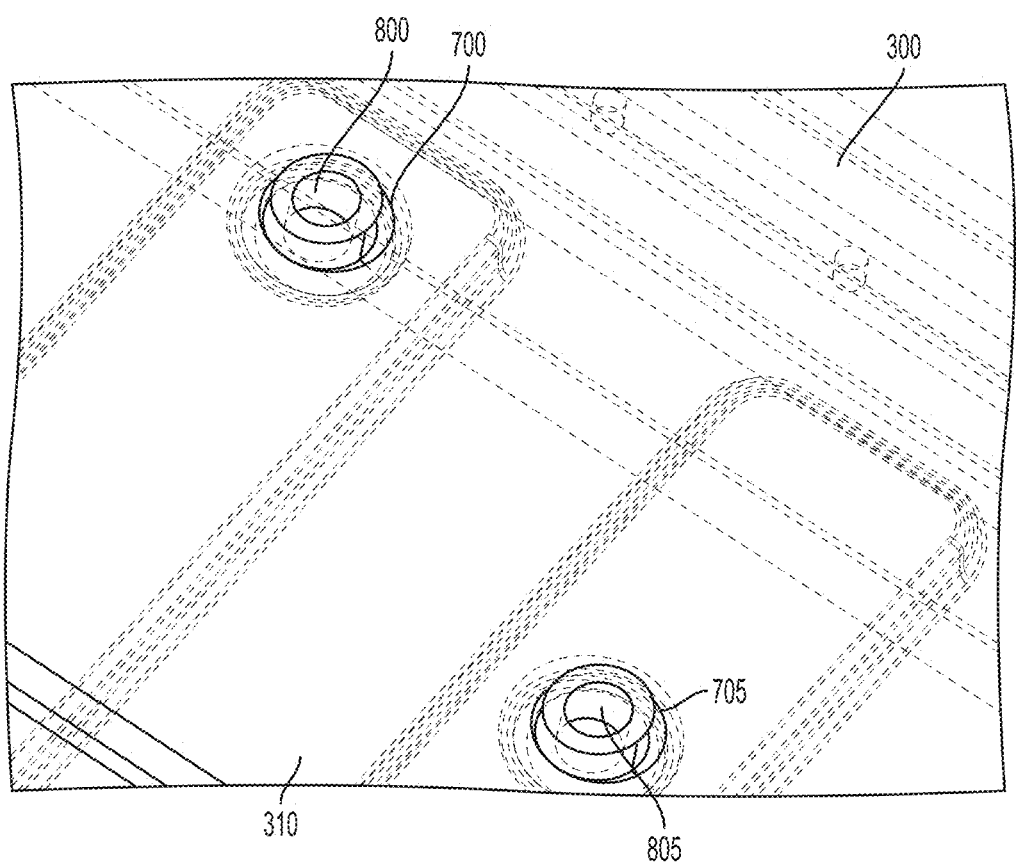
FIG. 8 depicts a close-up view of a portion of an example cold plate within a cavity of a battery pack.

FIG. 8 depicts a close-up view of a portion of the cold plate 310 within the cavity 200 of the apparatus 100. The cold plate 310 can include at least one inlet collar 800 and at least one outlet collar 805. The inlet collar 800 and the outlet collar 805 each can define an aperture to pass the coolant into the cold plate 310. The inlet collar 800 can be situated, disposed, or arranged on the inlet 700. The inlet collar 800 can lie on be supported by aperture defining the inlet 700. The aperture defined by the inlet collar 800 can be smaller in size than the aperture defined by the aperture defining the inlet 700. Arranged in the inlet 700, at least a portion of the inlet collar 800 can extend outside the cold plate 310. At least a portion of the inlet collar 800 can extend within the channel 710 of the cold plate 310. The outlet collar 805 can be situated, disposed, or arranged on the outlet 705. The outlet collar 805 can lie on or be supported by the aperture defining the outlet 705. The aperture defined by the outlet collar 805 can be smaller in size than the aperture defined by the aperture defining the outlet 705. Arranged in the outlet 705, at least a portion of the outlet collar 805 can extend outside the cold plate 310. At least a portion of the outlet collar 805 can extend within the channel 710 of the cold plate 310. The inlet collar 800 and the outlet collar 805 each can be of any shape, and can be triangular, rectangular, polygonal, circular, elliptical, among others. A length of the inlet collar 800 and the outlet collar 805 can range between 3 mm to 9 mm. A length of the aperture defined by the inlet collar 800 and the aperture defined by the outlet collar 805 can range between 3 mm to 9 mm. A width of the inlet collar 800 and the outlet collar 805 can range between 5 mm to 15 mm. A width of the aperture defined by the inlet collar 800 and the aperture defined by the outlet collar 805 can range between 3 mm to 9 mm. A height of the portion of the inlet collar 800 or the outlet collar 805 extending outside the cold plate 310 can range between 3 mm to 9 mm.

Figure 9:
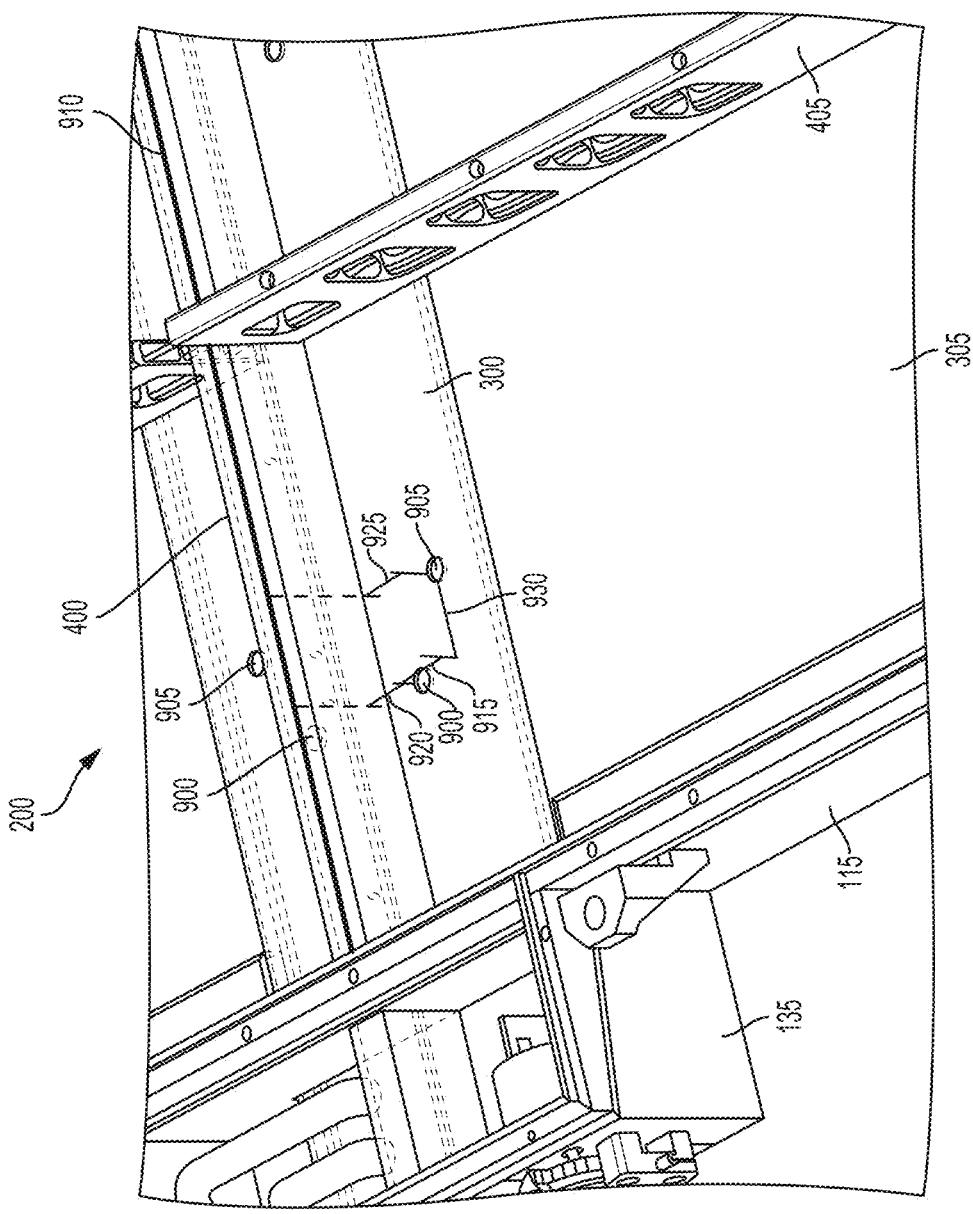
FIG. 9 depicts a close-up view of a portion of a cavity of a battery pack for an example apparatus.
Figure 10:
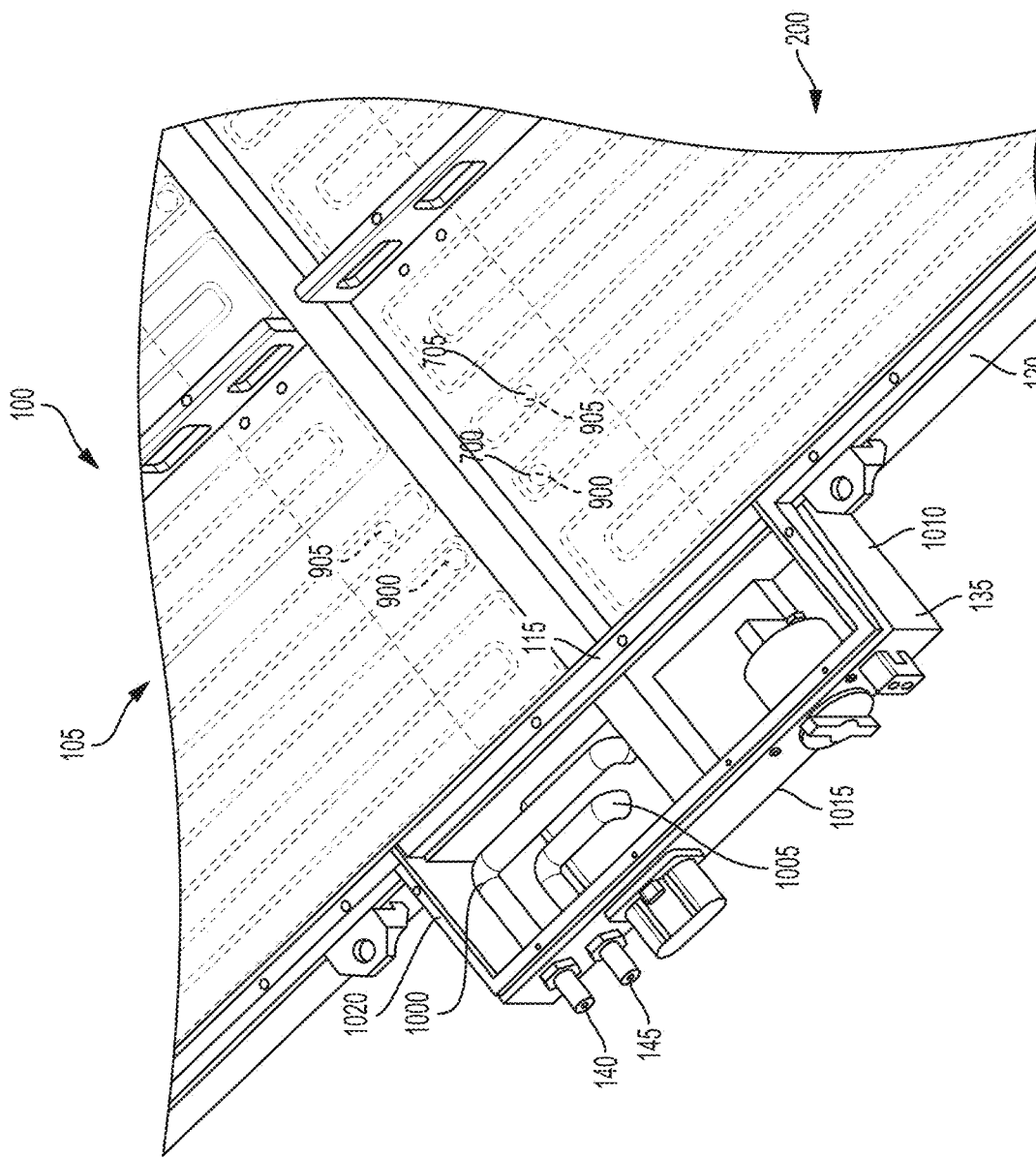
FIG. 10 depicts a close-up view of a portion of a cavity of a battery pack for an example apparatus.

FIGS. 9 and 10 each depict a close-up view of a portion of the cavity 200 of the apparatus 100. The bottom panel 205 can define or include at least one inlet port 900 and at least one outlet port 905 to deliver the coolant throughout the housing 110 for the battery pack 105. The bottom ridge plate 300 (as depicted) can define or include a set of inlet ports 900 and a set of outlet ports 905. The bottom cover plate 305 can also define or include the set of inlet ports 900 and the outlet ports 905. Each inlet port 900 and each outlet port 905 can be defined through the top surface of the bottom panel 205 and the bottom surface of the bottom panel 205. The inlet port 900 and the outlet port 905 each can include an aperture or a hole through the bottom panel 205. The inlet port 900 and the outlet port 905 each can be of any shape, and can be triangular, rectangular, polygonal, circular, elliptical, among others. The inlet port 900 and the outlet port 905 can each have a length ranging between 8 mm to 16 mm. The inlet port 900 and the outlet port 905 can each have a width ranging between 8 mm to 16 mm.

The inlet port 900 and the outlet port 905 can be positioned at an offset distance from each other relative to a lateral axis 910 (corresponding to the bold line in FIG. 9) of the housing 110. The lateral axis 910 can be parallel to at least one of the lateral side of the housing 110. For example as illustrated, the lateral axis 910 can be parallel to the second side wall 120 and the fourth side wall 130 through a midline of the housing 110. The inlet port 900 and the outlet port 905 can be positioned or located at an offset distance 915 (sometimes referred herein as a relative offset distance) ranging between 15 mm to 45 mm from each other relative to the lateral axis 910. The inlet port 900 can have an offset distance 920 (sometimes referred herein as an inlet port offset distance) from the lateral axis 910 of the housing 110. The outlet port 905 can have an offset distance 925 (sometimes referred herein as an outlet port offset distance) from the lateral axis 910 of the housing 110. The offset distance 920 can range between 15 mm to 45 mm relative to the lateral axis 910. The offset distance 925 can range between 40 mm to 80 mm relative to the lateral axis 910. The offset distance 920 can differ from the offset distance 925, and vice-versa. The offset distance 920 can be greater than the offset distance 925 to position the outlet port 905 closer to the lateral axis 910 than the inlet port 900. The offset distance 920 can be less than the offset distance 925 to position the inlet port 900 closer to the lateral axis 910 than the outlet port 905. The inlet port 900 and the outlet port 905 can be at the offset distance 915 relative to one of the lateral sides (e.g., the first side wall 115, the second side wall 120, the third side wall 125, or the fourth side wall 130) that can be substantially parallel (e.g., within 15% deviation) with the lateral axis 910. For example as illustrated, the lateral axis 910 can be substantially orthogonal (e.g., within 15% deviation) to the second side wall 120 and the fourth side wall 130 and can be substantially parallel with the first side wall 115 and the third side wall 125. With the lateral axis 910 defined along one of the lateral side of the housing 110, the inlet port 905 and the outlet port 910 can be at different distances relative to the lateral side of the housing 110 (e.g., the first side wall 115, the second side wall 120, the third side wall 125, or the fourth side wall 130). The inlet port 900 and the outlet port 905 can have an offset distance 930 from each other parallel to the lateral axis 910. The offset distance 930 between the inlet port 900 and the outlet port 905 can range between 30 mm to 70 mm.

The set of inlet ports 900 and the set of outlet ports 905 can convey the coolant throughout the housing 110. Each inlet port 900 can be fluidly coupled with the inlet 140 of the support structure 135 via the distribution plate 600. One of the inlet ports 900 can be arranged or disposed on an inlet 700 of the cold plate 310 to fluidly couple the inlet port 900 with the inlet 700. The inlet port 900 can be at least partially aligned with the inlet 700 of the cold plate 310 to directly convey the coolant from the distribution plate 600 to the cold plate 310. At least a portion of the inlet 700 can be positioned within the inlet port 900 to fluidly couple to the inlet 700 with the inlet port 900. Disposed on the inlet port 900, the inlet 700 can be substantially at the offset distance 920 (e.g., within 15% deviation) relative to one of the lateral sides (e.g., the first side wall 115, the second side wall 120, the third side wall 125, or the fourth side wall 130) substantially parallel with the lateral axis 910 (e.g., within 15% deviation). The offset distance 920 can be greater than the offset distance 720 relative to one of the edges of the cold plate 310. The inlet collar 800 disposed within the inlet 700 of the cold plate 310 can extend into the inlet port 900 defined by the bottom panel 205 to align the inlet 700 with the inlet port 900. Each inlet port 900 can be fluidly coupled with the inlet 700 of the cold plate 310 arranged on the inlet port 900. Each inlet port 900 can receive the coolant from the inlet 140 of the support structure 135 via the distribution plate 600. Each inlet port 900 can pass the coolant into the channel 710 of the cold plate 310 via the inlet 700 arranged on the inlet port 900.

In addition, each outlet 705 can be fluidly coupled with the outlet 145 of the support structure 135 via the distribution plate 600. One of the outlet ports 905 can be arranged or disposed on an outlet 705 of the cold plate 310 to fluidly couple the outlet port 905 with the outlet 705. The outlet port 905 can be at least partially aligned with the outlet 705 of the cold plate 310 to directly receive the coolant released from the cold plate 310 to pass onto the distribution plate 600. At least a portion of the outlet 705 can be positioned within the outlet port 905 to fluidly couple to the outlet 705 with the outlet port 905. Disposed on the outlet port 905, the outlet 705 can be substantially at the offset distance 925 (e.g., within 15% deviation) relative to one of the lateral sides (e.g., the first side wall 115, the second side wall 120, the third side wall 125, or the fourth side wall 130) substantially parallel with the lateral axis 910 (e.g., within 15% deviation). The offset distance 925 can be greater than the offset distance 725 relative to one of the edges of the cold plate 310. With the inlet 700 disposed on the inlet port 900 and the outlet 705 on the outlet port 905, the inlet 700 and the outlet 705 can be substantially at the offset distance 915 (e.g., within 15% deviation) to each other relative to the lateral axis 910. The outlet collar 805 disposed within the outlet 705 of the cold plate 310 can extend into the outlet port 905 defined by the bottom panel 205 to align the outlet 705 with the outlet port 905. Each outlet port 905 can be fluidly coupled with the outlet 705 of the cold plate 310 arranged on the outlet 705. Each outlet port 905 can release the coolant from the outlet 705 of the cold plate 310 to the outlet 145 of the support structure 135 via the distribution plate 600. Each outlet port 905 can pass the coolant released from the channel 710 of the cold plate 310 via the outlet 705 arranged on the outlet port 905.

The support structure 135 can include at least one lateral side, such as a first side wall 1010, a second side wall 1015, and a third side wall 1020. Each lateral side (e.g., the first side wall 1010, the second side wall 1015, and the fourth side 1020) of the support structure 135 can form or can be a part of the housing 110. The first side wall 1010 of the support structure 135 can extend from the second side wall 120 of the housing 110. One end of the first side wall 1010 can be attached, joined, or otherwise disposed on an exterior side of the second side wall 120 of the housing 110. The third side wall 1020 of the support structure 135 can extend from the second side wall 120 of the housing 110. One end of the third side wall 1020 can be attached, joined, or otherwise disposed on the exterior side of the second side wall 120 of the housing 110. The second side wall 1015 of the support structure 135 can be detached or separated from the second side wall 120 of the housing 110. The second side wall 1015 of the support structure 135 can be substantially parallel (e.g., deviation of 15%) with second side wall 120 of the housing 110. Together with the lateral sides of the support structure 135, the separation between the second side 1015 from the second side wall 120 can define a cavity within the support structure 135. Along one of the lateral side of the support structure 135 (e.g., the second side wall 1015), the support structure 135 can define the inlet 140 and the outlet 145. A length of the first side wall 1010 and the third side wall 1020 can range between 100 mm to 140 mm. A length of the second side wall 1015 can be less than the length of the second side wall 120 of the housing 110, and can range between 390 mm to 430 mm. A height of the lateral sides of the support structure 135 can range between 83 mm to 133 mm.

Within cavity of the support structure 135, the support structure 135 can include at least one intake conduit 1000 and at least one outtake conduit 1005. The intake conduit 1000 and the outtake conduit 1005 each can be a fluid conveyance, such as a pipe. The intake conduit 1000 and the outtake conduit 1005 each can include a set of segments. One end of one segment can be attached, sealed, or otherwise joined to one end of another segment. A length of the intake conduit 1000 and a length of the outtake conduit 1005 each can be less than the length of the second side wall 120 of the housing 110 or the lateral sides of the support structure 135. The length of the intake conduit 1000 and the length of the outtake conduit 1005 each can range between 180 mm to 240 mm. The length of the intake conduit 1000 can differ from the length of the outtake conduit 1005, and vice-versa. A width (or diameter) of the intake conduit 1000 and a width (or diameter) of the outtake conduit 1005 can range between 17 mm to 27 mm. In this manner, the use of pipes in conveying the coolant through the housing 110 can be restricted to one area of the battery pack 105.

The intake conduit 1000 can be fluidly coupled with the inlet 140 and with the distribution plate 600. One end of the intake conduit 1000 can be connected with the inlet 140 defined on the support structure 135. Another end of the intake conduit 1000 can be connected with the distribution plate 600. The intake conduit 1000 can receive the coolant from outside the housing 110 for the battery pack 105. For example, the intake conduit 1000 can be fluidly coupled with the fluid tank and the pressure regulator feeding the coolant via the inlet 140 into the housing 110. The intake conduit 1000 can pass the coolant to the distribution plate 600 to supply the coolant to the set of cold plates 310 coupled with the distribution plate 600. The outtake conduit 1005 can be fluidly coupled with the outlet 145 and with the distribution plate 600. One end of the outtake conduit 1005 can be connected with the outlet 145 defined on the support structure 135. Another end of the outtake conduit 1005 can be connected with the distribution plate 600. The outtake conduit 1005 can receive the coolant released from the cold plates 310 via the distribution plate 600. The outtake conduit 1005 can release the coolant from the distribution plate 600 via the outlet 145 to outside the housing 110 for the battery pack 105.

Figure 11:
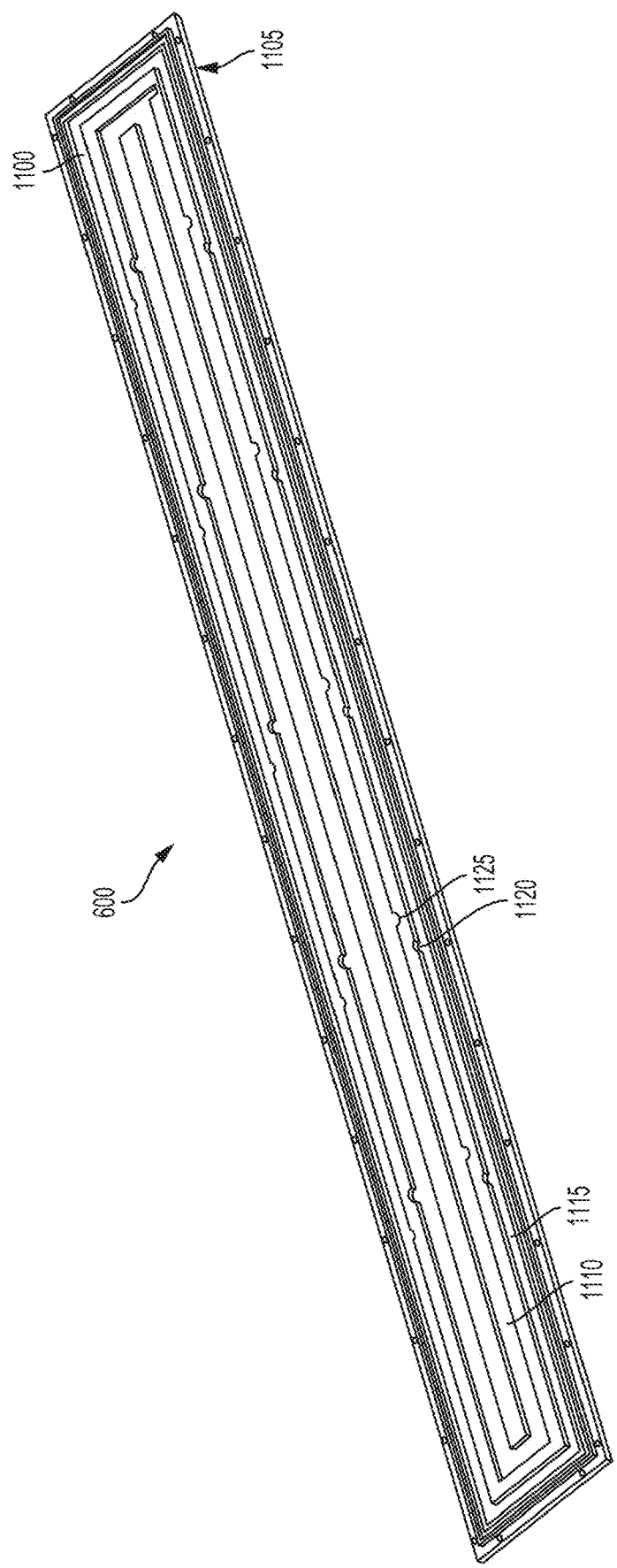
FIG. 11 depicts an isometric view of an example distribution plate for a battery pack.

FIG. 11 depicts an isometric view of the distribution plate 600 for the apparatus 100. The distribution plate 600 can have a top surface 1100 and a bottom surface 1105. The top surface 1100 can correspond to a longitudinal side of the distribution plate 600 facing or disposed on the bottom side of the bottom panel 205. The bottom surface 1105 can correspond to the longitudinal side of the distribution plate 600 opposite of the top surface 1100. The top surface 1100 can be disposed or arranged on the bottom surface of the bottom panel 205 of the housing 110. The top surface 1100 can at least partially span the bottom surface of the bottom panel 205. The top surface 1100 can be at least partially flush with the bottom side of the bottom panel 205, the bottom ridge plate 300, or the bottom cover plate 305. The top surface 1100 can be sealed against the bottom surface of the bottom panel 205. The sealing between the top surface 1100 of the distribution plate 600 with the bottom surface of the bottom panel 205 can include any type of mechanical seal, such as a hermetic seal, an induction seal, a hydrostatic seal, a hydrodynamic seal, and a bonded seal, among others. The sealing of the bottom surface of the bottom panel 205 with the top surface 1100 of the distribution plate 600 can define the main channel therein to convey the coolant through the housing 110.

The top surface 1100 can define the main channel for the distribution plate 600. The top surface 1100 of the distribution plate 600 can define at least one intake channel 1110 and at least one outtake channel 1115 to circulate the coolant through the housing 110. The intake channel 1110 and the outtake channel 1115 can form the main channel of the distribution plate 600. Both the intake channel 1110 and the outtake channel 1115 can extend or span across the top surface 1100 of the distribution plate 600. At least a portion of the intake channel 1110 can be a segment across the top surface 1100 substantially parallel (e.g., within 15% deviation) to an edge of the distribution plate 600. At least a portion of the outtake channel 1115 can be a segment across the top surface 1100 substantially parallel (e.g., within 15% deviation) to an edge of the distribution plate 600. At least a portion of the intake channel 1110 can be substantially parallel (e.g., within 15% deviation) with at least a portion of the outtake channel 1115 along the top surface 1100 of the distribution plate 600. The intake channel 1110 can be arranged or disposed along the bottom surface of the bottom panel 205 to align with the inlet ports 900 defined on the bottom panel 205. The intake channel 1110 can be fluidly coupled with the inlet ports 900 defined on the bottom panel 205. The outtake channel 1115 can be arranged or disposed along the bottom surface of the bottom panel 205 to align with the outlet ports 905 defined on the bottom panel 205. The outtake channel 1115 can be fluidly coupled with the outlet ports 905 defined on the bottom panel 205. The intake channel 1110 can be separate from the outtake channel 1115. One end of the intake channel 1110 can be connected to one end of the outtake channel 1115. The connection of the intake channel 1110 with the outtake channel 1115 can form a return conduit. The return conduit can correspond to any section between the intake channel 1110 and the outtake channel 1115 between couplings with the inlet ports 900 and couplings with the outlet ports 905.

Both the intake channel 1110 and the outtake channel 1115 can span across the top surface 1100. The intake channel 1110 and the outtake channel 1115 can each be a groove, a divot, or a trench partially spanning a depth of the distribution plate 600 from the top surface 1100. The shape of the intake channel 1110 and the outtake channel 1115 can each be a prismatic hollowing with a triangular, rectangular, pentagonal, semi-elliptical (e.g., as depicted in FIG. 0.11), and semi-circular base, among others. A length of the intake channel 1110 and a length of the outtake channel 1115 can range between 1800 mm to 2200 mm. A width (or diameter) of the intake channel 1110 and a width (or diameter) of the outtake channel 1115 can range between 15 mm to 45 mm. A depth of the intake channel 1110 and a depth of the outtake channel 1115 into the top surface 1100 can range between 0.5 mm to 15 mm.

The top surface 1100 can define at least one inlet spacing 1120 and at least one outlet spacing 1125 to convey the coolant into the cold plates 310. The inlet spacing 1120 and the outlet spacing 1125 can each be a hollow hole, a divot, or a trench partially spanning a depth of the distribution plate 600 from the top surface 1100. The shape of the inlet spacing 1120 and the outlet spacing 1125 can each be a prismatic hollowing with a triangular, rectangular, pentagonal, semi-elliptical (e.g., as depicted in FIG. 0.11), and semi-circular base, among others. A length of the inlet spacing 1120 and a length of the outlet spacing 1125 can range between 15 mm to 25 mm. A width (or diameter) of the inlet spacing 1120 and a width (or diameter) of the outlet spacing 1125 can range between 15 mm to 25 mm. A depth of the inlet spacing 1120 and a depth of the outlet spacing 1125 into the top surface 1100 can range between 3 mm to 7 mm.

Each inlet spacing 1120 can be fluidly coupled with the intake channel 1110. Each inlet spacing 1120 can be fluidly coupled with one of the inlet ports 900 defined on the bottom panel 205. Each inlet spacing 1120 can convey the coolant from the intake channel 1110 into the inlet ports 900. The inlet spacing 1120 can be fluidly coupled with the inlet port 900 of the bottom panel 205 and the inlet 700 defined on the cold plate 310 arranged on the inlet port 900. The inlet spacing 1120 can be disposed or arranged below the inlet port 900 defined through the bottom panel 205. The inlet spacing 1120 can be at least partially aligned with the inlet port 900 defined through the bottom panel 205 and the inlet 700 defined on the cold plate 310 arranged on the inlet port 900. At least a portion of the inlet spacing 1120 can be positioned to overlap the inlet port 900 defined on the bottom panel 205 and the inlet 700 defined on the cold plate 310. The inlet spacing 1120 can convey the coolant from the intake channel 1110 to the channel 710 of the cold plate 310 via the inlet port 900 and the inlet 700 aligned with the inlet spacing 1120. The inlet collar 800 disposed within the inlet 700 of the cold plate 310 can at least partially extend into the inlet spacing 1120 of the intake channel 1110.

Each outlet spacing 1125 can be fluidly coupled with the outtake channel 1115. Each outlet spacing 1125 can be fluidly coupled with one of the outlet port 905. Each inlet spacing 1120 can convey the coolant released from the outlet port 905 into outtake channel 1115. The outlet spacing 1125 can be fluidly coupled with the outlet port 905 of the bottom panel 205 and the outlet 705 defined on the cold plate 310 arranged on the outlet port 905. The outlet spacing 1125 can be disposed or arranged below the outlet port 905 defined through the bottom panel 205. The outlet spacing 1125 can be at least partially aligned with the outlet port 905 defined through the bottom panel 205 and the outlet 705 defined on the cold plate 310 arranged on the outlet port 905. At least a portion of the outlet spacing 1125 can be positioned to overlap the outlet port 905 defined on the bottom panel 205 and the outlet 705 defined on the cold plate 310. The outlet spacing 1125 can convey the coolant from the channel 710 of the cold plate 310 via the outlet port 905 and the outlet port 905 aligned with the outlet spacing 1125 to the outtake channel 1115. The outlet collar 805 disposed within the outlet 705 of the cold plate 310 can at least partially extend into the outlet spacing 1125 of the outtake channel 1115.

Figure 12:
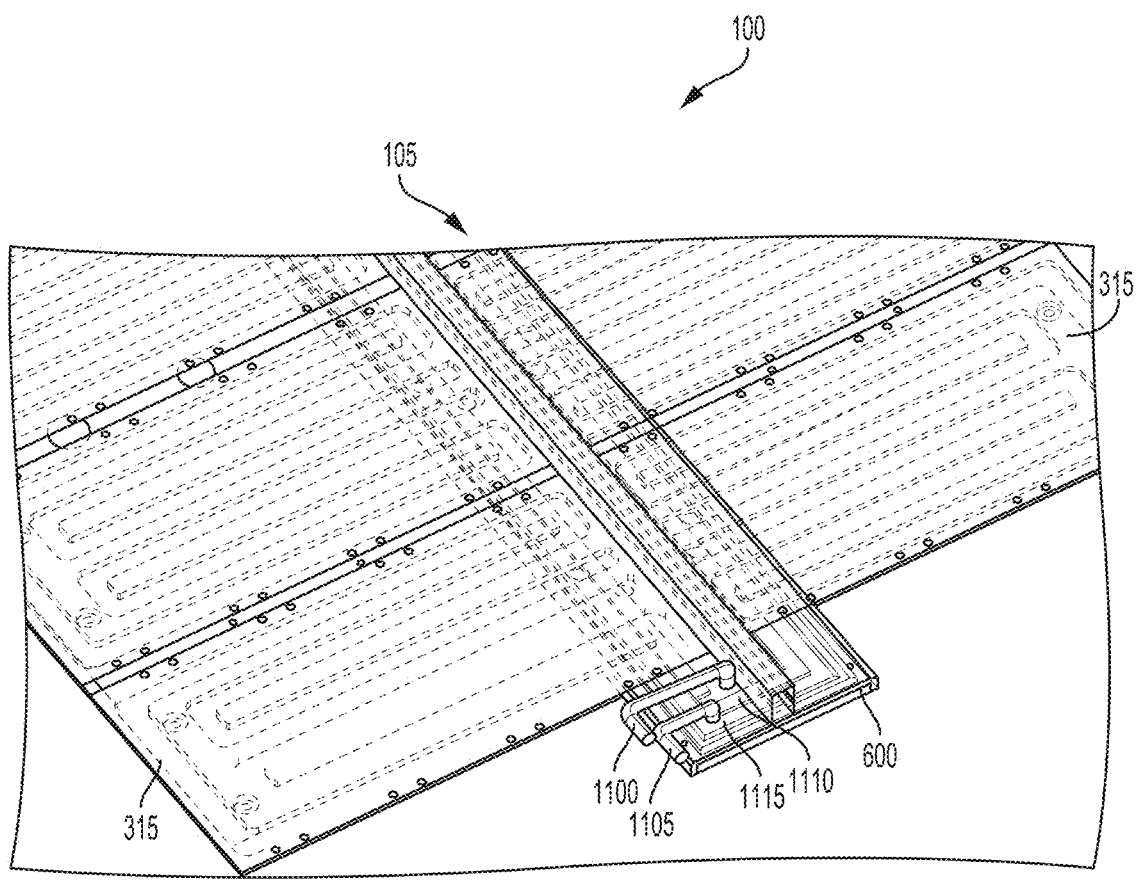
FIG. 12 depicts an isometric view of an example distribution plate arranged on a battery pack.

FIG. 12 depicts an isometric view of the distribution plate 600 arranged on the apparatus 100. As depicted, the distribution plate 600 can be arranged generally along the midline of the housing 110 on the bottom side of the bottom panel 205. The intake conduit 1000 of the support structure 135 can be fluidly coupled with the intake channel 1110 defined on the distribution plate 600. One end of the intake conduit 1000 can be connected or coupled with a portion of the intake channel 1110. Via the coupling with the intake channel 1110, the intake conduit 1000 can be fluidly coupled with the inlet ports 900 defined along the bottom panel 205 and the inlets 700 defined on each cold plate 310 to distribute the coolant to the cold plates 310 housed in the cavity 200. In addition, the outtake channel 1115 of the distribution plate 600 can be fluidly coupled with the outtake channel 1115 defined on the distribution plate 600. One end of the outtake conduit 1005 can be connected or coupled with a portion of the outtake channel 1115. Via the coupling with the outtake channel 1115, the outtake conduit 1005 can be fluidly coupled with the outlet ports 905 defined along the bottom panel 205 and the outlets 705 defined on each cold plate 310 to receive coolant received from the cold plates 310.

Figure 13:
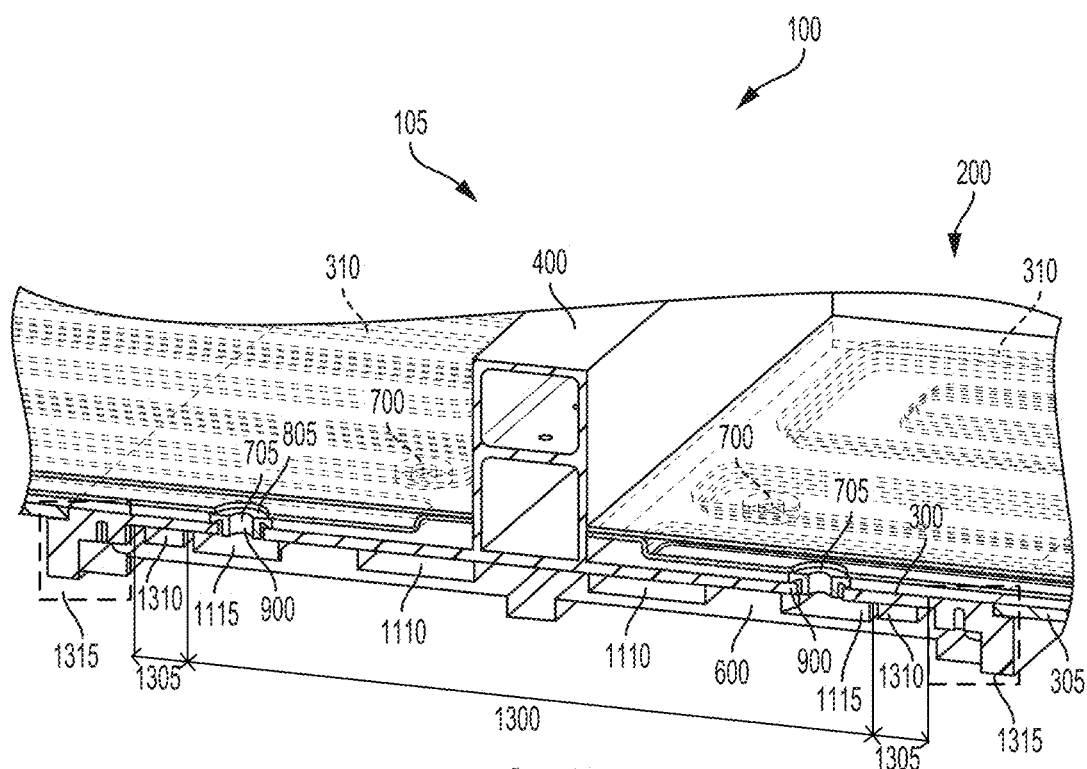
FIG. 13 depicts an axonometric cross-sectional view of a cavity of an example apparatus.

FIG. 13 depicts an axonometric cross-sectional view of the cavity 200 of the apparatus 100. As depicted, the distribution plate 600 can be disposed on the bottom surface of the bottom ridge plate 300. The distribution plate 600 can be in part beneath the cold plates 310 arranged in the cavity 200 of the housing 110. The distribution plate 600 can have an inner portion 1300 and an outer portion 1305. The inner portion 1300 can correspond to a central region of the distribution plate 600. The outer portion 1305 can correspond to a region about the edges forming the perimeter of the distribution plate 600. The inner portion 1300 of the distribution plate 600 can define including the intake channel 1110 and the outtake channel 1115 forming the main channel to circulate the coolant through the housing 110 for the battery pack 105. The intake channel 1110 of the distribution plate 600 can be arranged or positioned beneath the inlet port 900 defined on the bottom ridge plate 300 and the inlet 700 defined on the cold plate 310. The inlet collar 800 can arrange the alignment of the inlet 700 of the cold plate 310 with the inlet port 900 on the bottom ridge plate 300 and intake channel 1110. The outtake channel 1115 of the distribution plate 600 can be arranged or positioned beneath the outlet port 905 defined on the bottom ridge plate 300 and the outlet 705 defined on the cold plate 310. The outlet collar 805 can arrange the alignment of the outlet 705 of the cold plate 310 with the outlet port 905 on the bottom ridge plate 300 and outtake channel 1115.

The outer portion 1305 of the distribution plate 600 can have a sealing element 1310 to join or hold the top surface 1100 of the distribution plate 600 onto the bottom surface of the bottom ridge plate 300. The sealing element 1310 can form a mechanical seal between at least a portion of the top surface 1100 of the distribution plate 600 with the bottom surface of the bottom ridge plate 300. The sealing element 1310 can be a gasket, a washer, an O-ring, a cap, a fitting, a hose coupling, or any other component to form the mechanical seal with at least a portion of the top surface 1100 with the bottom surface of the bottom ridge plate 300. At least a portion of a top surface of the sealing element 1310 can be in contact or be flush with the bottom surface of the bottom ridge plate 300. The sealing element 1310 can be disposed, arranged, or otherwise included into a portion of the top surface 1100 of the distribution plate 600. The sealing element 1310 can be contained with an impression (e.g., as depicted in FIG. 13) defined on the portion of the top surface 1100 of the distribution plate 600.

The bottom ridge plate 300 can define or include a docking structure 1315 for insert the distribution plate 600 along the bottom side of the bottom ridge plate 300. The docking structure 1315 can be formed from the bottom ridge plate 300. The docking structure 1315 can correspond to a portion of the bottom side of the bottom ridge plate 300 protruding from the bottom external surface of the bottom ridge plate 300. The portion of the bottom ridge plate 300 to hold the distribution plate 600 onto the bottom surface of the bottom ridge plate 300 can correspond to a depressed region along the bottom surface of the bottom ridge plate 300. The docking structure 1315 can include any type of joint, such as a trench joint, a dovetail joint, a finger joint, a dowel joint, a bridle joint, and a spline joint, among others. Within the joint of the docking structure 1315, the distribution plate 600 can be held, secured, or otherwise positioned along the bottom surface of the bottom ridge plate 300.

Figure 14:
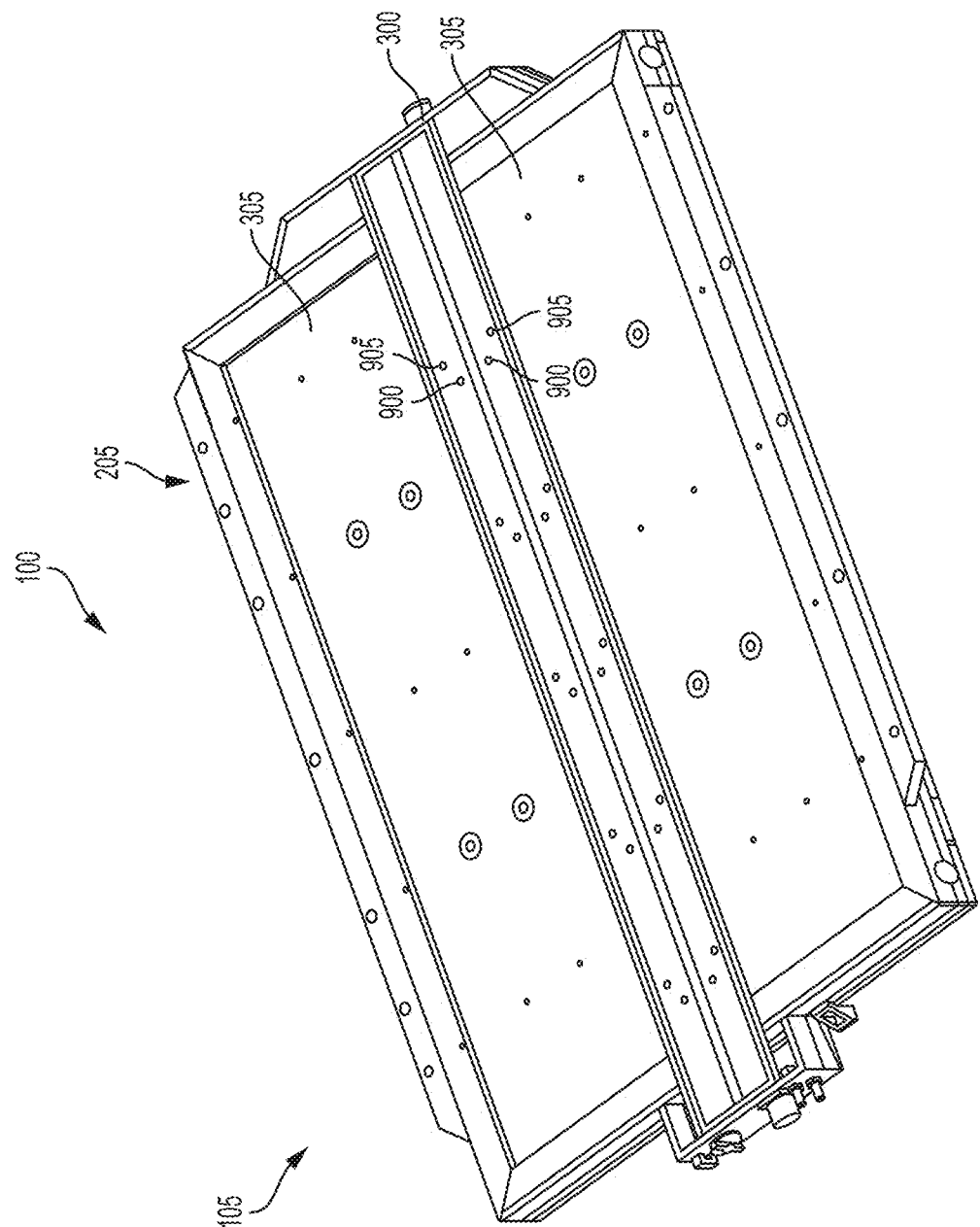
FIG. 14 depicts an isometric view of an underside of an example apparatus for powering electric vehicles.
Figure 15:
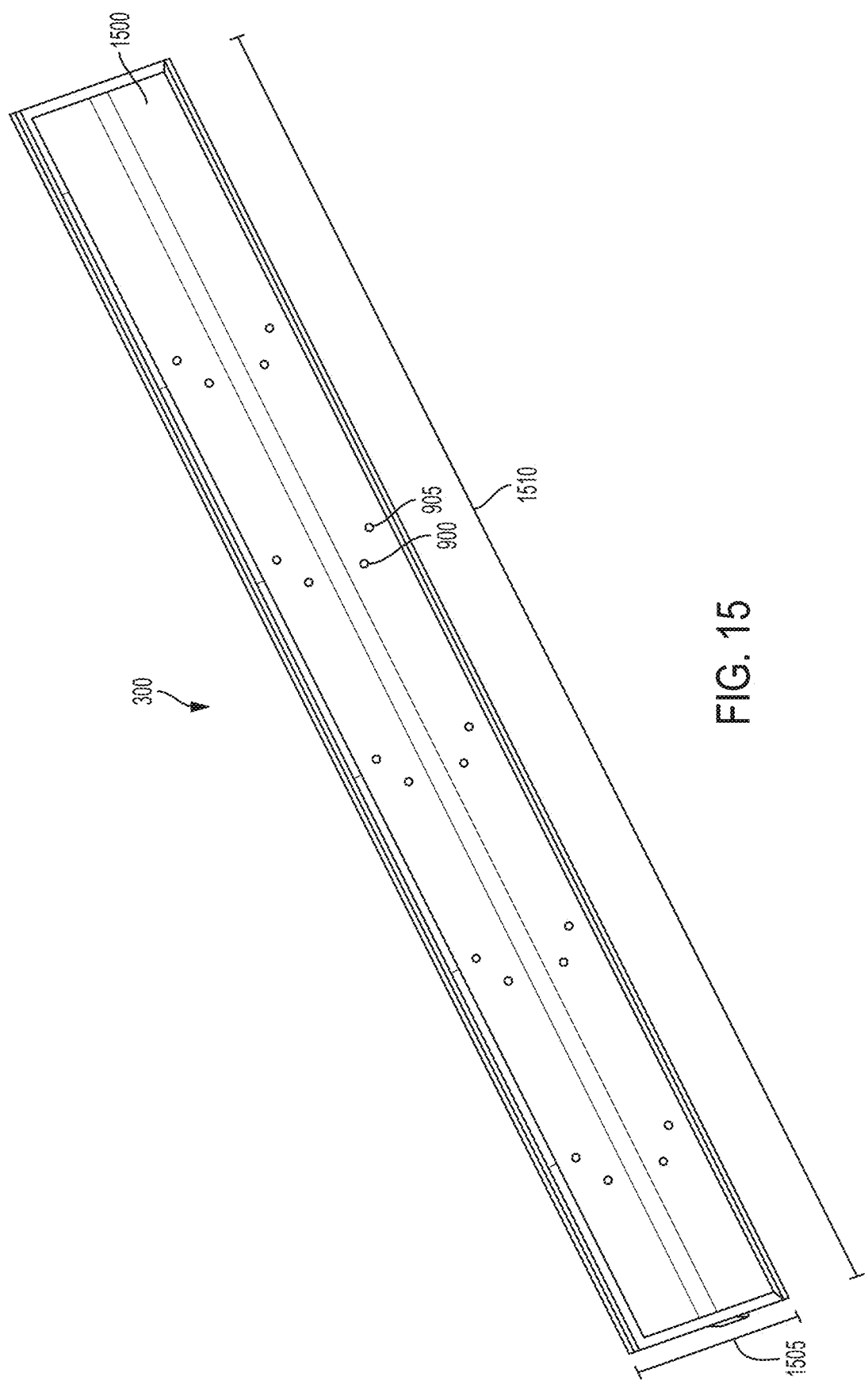
FIG. 15 depicts an isometric view of a bottom surface of an example bottom plate for a battery pack.
Figure 16:
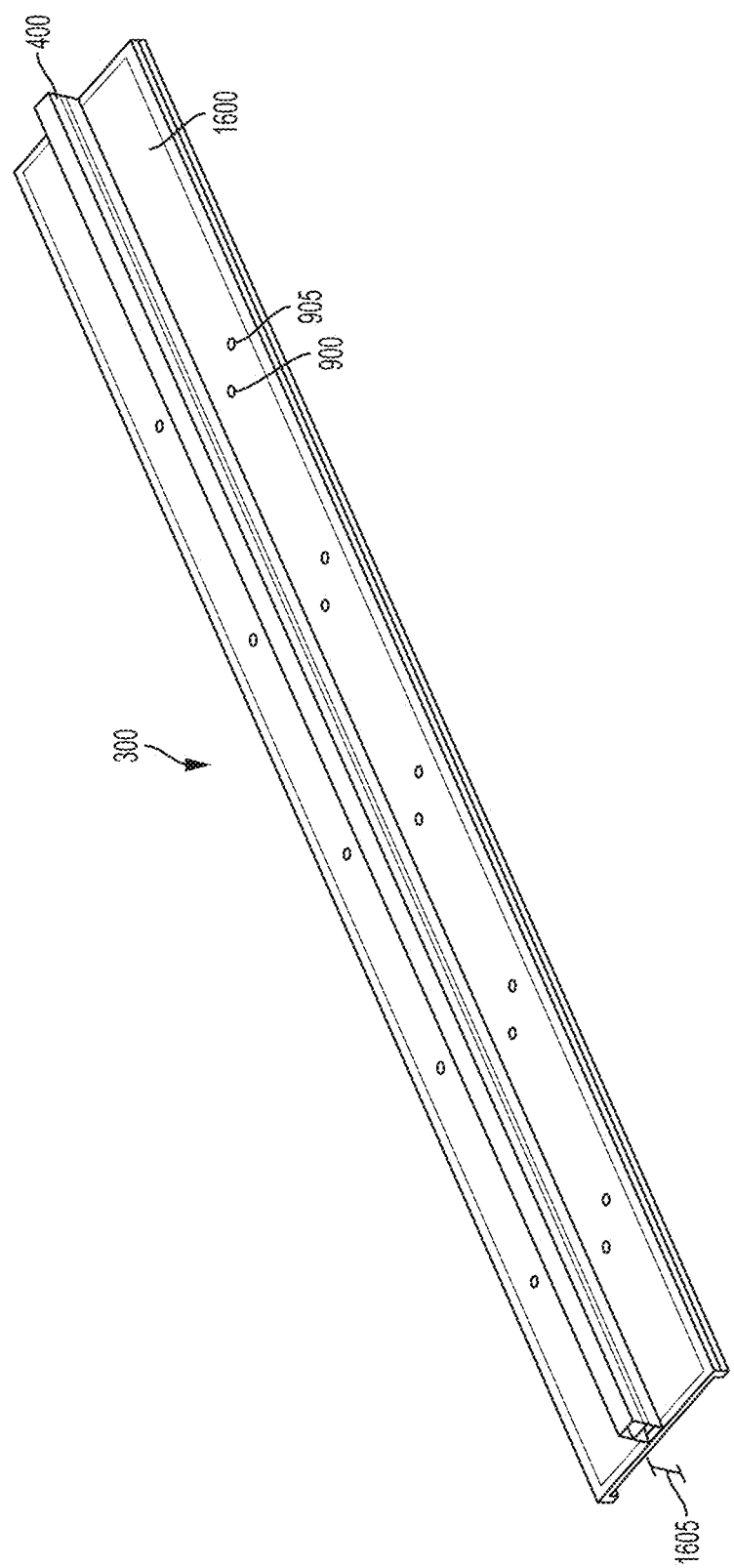
FIG. 16 depicts an isometric view of a top surface of an example bottom plate for a battery pack.

FIG. 14 depicts an isometric view of an underside of the apparatus 100 for powering electric vehicles. As depicted, the bottom panel 205 can include the bottom ridge plate 300, the bottom cover plates 305. In the depiction, the distribution plate 600 may not have been added to the bottom panel 205 along the bottom ridge plate 300 yet. The inlet ports 900 and the outlet ports 905 defined through the bottom ridge plate 300 can be exposed on the bottom surface of the bottom panel 205. FIG. 15 depicts an isometric view of a bottom surface 1500 of the bottom ridge plate 300 of the apparatus 100. FIG. 16 depicts an isometric view of a top surface 1600 of the bottom ridge plate 300 for the apparatus 100. As depicted, the bottom ridge plate 300 can have the inlet ports 900 and outlet ports 905 defined through the bottom surface 1500 to the top surface 1600. Along the bottom surface 1500, the bottom ridge plate 300 can have a width 1505 ranging between 204 mm to 254 mm and a length 1510 ranging between 1960 mm to 2360 mm. Along the top surface 1600, the bottom ridge plate 300 can have the at least one lengthwise divider element 400. The lengthwise divider element 400 can correspond to an extrusion portion of the bottom ridge plate 300 from the top surface 1600. The lengthwise divider element 400 can have a height 1605 ranging between 39 mm to 59 mm.

Figure 17:
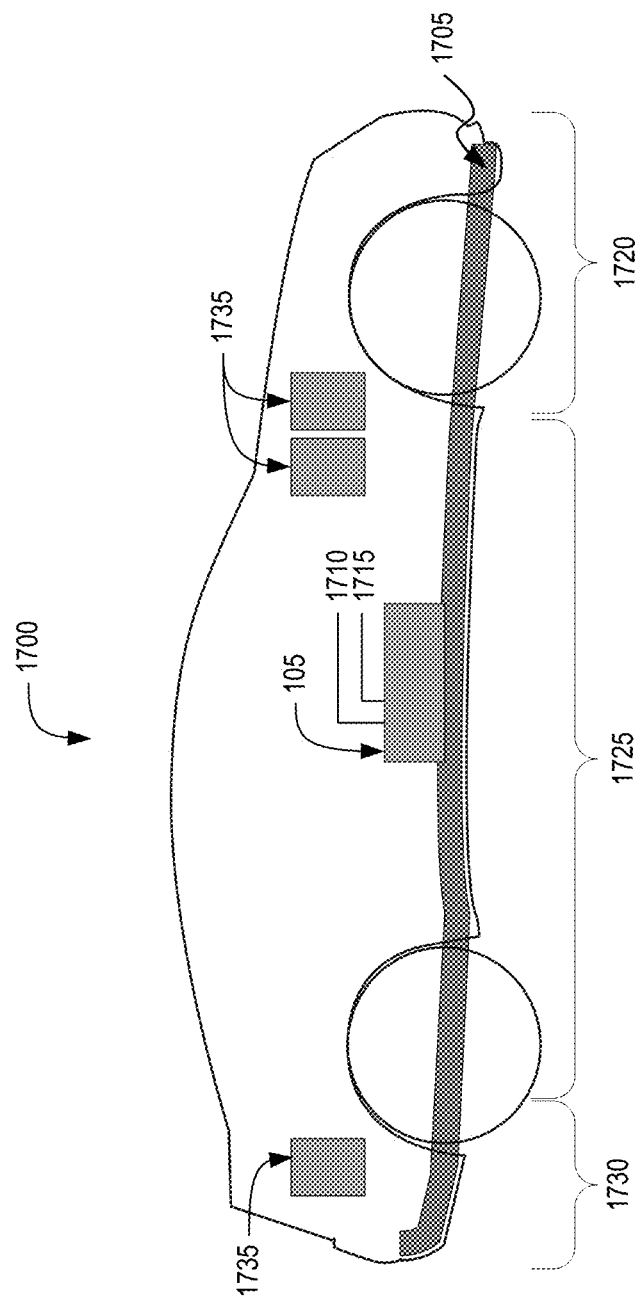
FIG. 17 is a block diagram depicting a cross-sectional view of an example electric vehicle installed with a battery pack.

FIG. 17 depicts a cross-section view of an electric vehicle 1700 installed with the battery pack 105. The electric vehicle 1700 can be an electric automobile (e.g., as depicted), a motorcycle, a scooter, a passenger vehicle, a passenger or commercial truck, and another type of vehicle such as sea or air transport vehicles, a plane, a helicopter, a submarine, a boat, or a drone, among others. The electric vehicle 1700 can include a chassis 1705 (e.g., a frame, internal frame, or support structure). The chassis 1705 can support various components of the electric vehicle 1700. The chassis 1705 can span a front portion 1720 (e.g., a hood or bonnet portion), a body portion 1725, and a rear portion 1730 (e.g., a trunk portion) of the electric vehicle 1700. The one or more battery packs 105 can be installed or placed within the electric vehicle 1700. The one or more battery packs 105 can be installed on the chassis 1705 of the electric vehicle 1700 within the front portion 1720, the body portion 1725 (as depicted in FIG. 17), or the rear portion 1730. The battery pack 105 can provide electrical power to one or more other components 1735 (e.g., a motor, lights, radio, door, hood, or trunk opening, or other functionality) by electrically coupling with at least one positive current collector 1710 (e.g., a positive busbar) and at least one negative current collector 1715 (e.g., a negative busbar). The positive current collector 1710 can be electrically coupled with the positive terminal of the battery pack 105 (e.g., through the terminal port structure 160 of the lid structure 150). The negative current collector 1715 can be electrically coupled with the negative terminal of the battery pack 105 (e.g., through the terminal port structure 160 of the lid structure 150). The one or more components 1735 can include an electric engine, an entertainment system (e.g., a radio, display screen, and sound system), on-board diagnostics system, and electric control units (ECUs) (e.g., an engine control module, a transmission control module, a brake control module, and a body control module), among others.

Figure 18:
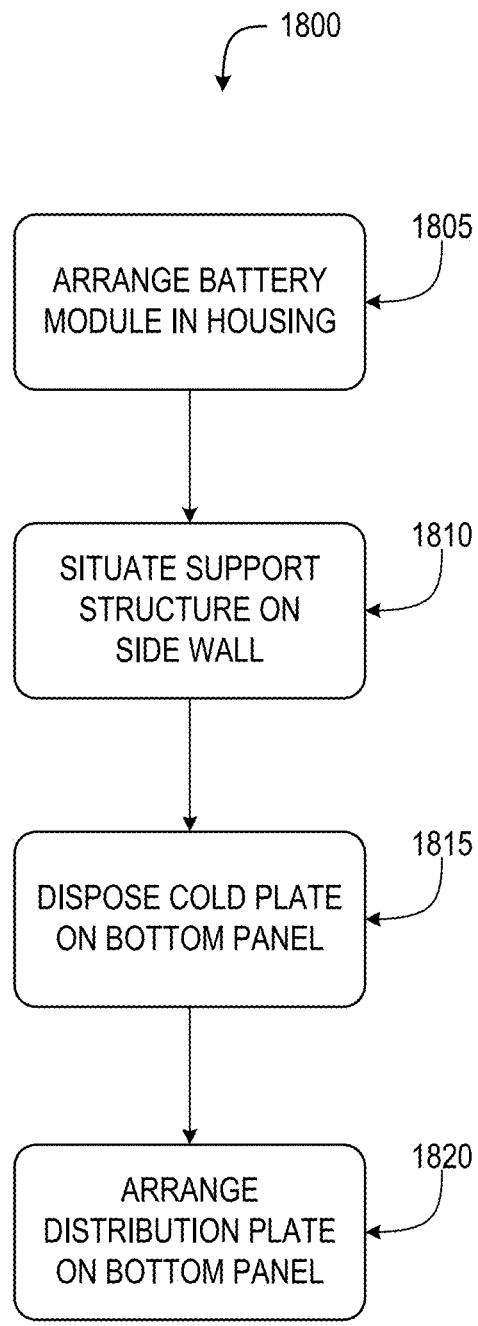
FIG. 18 is a flow diagram depicting an example method of assembling a battery pack for powering electric vehicles.

FIG. 18 depicts an example flow diagram for a method 1800 of assembling a battery module for powering electric vehicles. The method 1800 can be implemented using any of the components detailed herein in conjunction with FIGS. 1-17. The method 1800 can include arranging a battery module 210 in a housing 110 (ACT 1805). The battery module 210 can include a set of battery cells (e.g., lithium-based battery cells) to store electrical energy to power one or more components 1735 of an electric vehicle 1700. The housing 110 can include a first side wall 115, a second side wall 120, a third side wall 125, and a fourth side wall 130 along the lateral sides and a bottom panel 205 along a bottom longitudinal side. The bottom panel 205 can include a bottom ridge plate 300 and a bottom cover plate 305. The bottom panel 205 can define an inlet port 900 and an outlet port 905 to circulate coolant throughout the housing 110. The first side wall 115, the second side wall 120, the third side wall 125, the fourth side wall 130, and the bottom panel 205 to define a cavity 200. A set of battery modules 210 can be arranged, disposed, or placed in parallel into the cavity 200 of the housing 110. Each battery module 210 can be supported by at least a portion of a top surface of the bottom panel 205.

The method 1800 can include situating a support structure 135 on a side wall (e.g., the second side wall 120) (ACT 1810). The support structure 135 can be arranged or situated on an external surface of the second side wall 120. The support structure 135 can extrude from the second side wall 120, and can be attached, joined, or otherwise added along the external surface of the second side wall 120 of the housing 110 (e.g., using a fastening element, joint, or adhesive). The support structure 135 can partially span the second side wall 120 of the housing 110, and can have a length less than a length of the second side wall 120. The support structure 135 can define an inlet 140 and an outlet 145 along one of the lateral sides (e.g., a second side wall 1015) of the support structure 135. The inlet 140 and the outlet 145 each can be an aperture or a hole through the second side wall 1015 of the support structure 135. The inlet 140 can receive coolant from outside the housing 110 of the battery pack 105. The outlet 145 can release the coolant from within the housing 110. The support structure 135 can also include an intake conduit 1000 and an outtake conduit 1005. The intake conduit 1000 and the outtake conduit 1005 each can be a pipe having one or more segments. The intake conduit 1000 can be sealed, attached, or otherwise joined with the inlet 140 to fluidly couple with the inlet 140 to receive the coolant from outside the housing 110. The outtake conduit 1005 can be sealed, attached, or otherwise joined with the outlet 145 to fluidly couple with the outlet 145 to release the coolant from within the housing 110. The intake conduit 1000 can be fluidly coupled with the inlet ports 900 defined on the bottom panel 205. The outtake conduit 1005 can be fluidly coupled with the outlet ports 905 defined on the bottom panel 205.

The method 1800 can include disposing a cold plate 310 on the bottom panel 205 (ACT 1815). The cold plate 310 can define an inlet 700, an outlet 705, and a channel 710. The inlet 700 can be disposed or arranged on one of the inlet ports 900 of the bottom panel 205 to fluidly couple with the inlet port 900 and the intake conduit 1000. The cold plate 310 can be placed to align the inlet 700 with the inlet port 900 defined on the bottom panel 205. The inlet 700 can receive the coolant conveyed via the intake conduit 1000 and the inlet port 900. The outlet 705 can be disposed or arranged on one of the outlet ports 905 of the bottom panel 205 to fluidly couple with the outlet port 905 and the outtake conduit 1005. The outlet 705 can release the coolant into the outlet port 905. The cold plate 310 can be placed to align the outlet 705 with the outlet port 905 defined on bottom panel 205. The channel 710 can be a hollow path within the cold plate 310 and can span from the inlet 700 to the outlet 705 to circulate the coolant from the inlet 700 and the outlet 705. A set of cold plates 310 can be arranged or disposed along the bottom panel 205 of the housing 110 within the cavity 200. Each cold plate 310 can be mechanically coupled with the bottom panel 205 by inserting a mounting element within a mounting hole 715 defined through the cold plate 310. Each cold plate 310 can be supported by at least a portion of the top surface of the bottom panel 205. Each cold plate 310 can support one of the battery modules 210 within the cavity 200, and can be thermally coupled with the battery module 210. The coolant circulating through the channel 710 of the cold plate 310 can transfer the heat away from the battery module 210 thermally coupled with the battery module 210.

The method 1800 can include arranging a distribution plate 600 on the bottom panel 205 (ACT 1820). The distribution plate 600 can include an inner portion 1300 and an outer portion 1305. The inner portion 1300 can correspond to an internal region of distribution plate 600. The outer portion 1305 can correspond to an exterior region along the edges forming the perimeter of the distribution plate 600. Within the inner portion 1300, a top surface 1100 of the distribution plate 600 can define an intake channel 1110 and an outtake channel 1115. The intake channel 1110 can be fluidly coupled with the intake conduit 1000 to receive the coolant from outside the housing 110 via the intake conduit 1000. The intake channel 1110 can be positioned or situated along the bottom surface of the bottom panel 205 to align with inlet ports 900. The intake channel 1110 can also be fluidly coupled with the inlets 700 of the cold plates 310 within the housing 110 to deliver the coolant to the cold plates 310 via the inlets 700 and the inlet ports 900. The outtake channel 1115 can be positioned or situated along the bottom surface of the bottom panel 205 to align with outlet ports 905. The outtake channel 1115 can also be fluidly coupled with the outlets 705 of the cold plates 310 within the housing 110 to deliver the coolant to the cold plates 310 via the outlets 705 and the outlet ports 905. In the outer portion 1305, the top surface 1100 of the distribution plate 600 can include a sealing element 1310. The sealing element 1310 can join or form a seal with the bottom surface of the bottom panel 205. The distribution plate 600 can be slid or inserted into the docking structure 1315 defined on the bottom panel 205 to secure the distribution plate 600 along the bottom surface.

Figure 19:
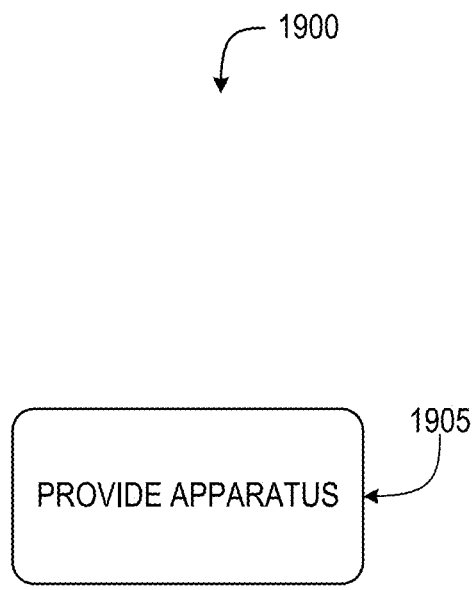
FIG. 19 is a flow diagram depicting an example method of providing an apparatus to an electric vehicle.

FIG. 19 depicts an example method 1900 for providing an apparatus to an electric vehicle. The method 1900 can be implemented using any of the components detailed herein in conjunction with FIGS. 1-17. The method can include providing an apparatus 100 (ACT 1905). The apparatus 100 can be provided in an electric vehicle 1700. The apparatus 100 can include a housing 110 for a battery pack 105 to power one or more components 1735 of an electric vehicle 1700. The housing 110 can include a first side wall 115, a second side wall 120, a third side wall 125, and a fourth side wall 130 along the lateral sides. The housing 110 can include a bottom panel 205 along a bottom longitudinal side. The first side wall 115, the second side wall 120, the third side wall 125, the fourth side wall 130, and the bottom panel 205 can define a cavity 200 within the housing 110. The bottom panel 205 can have a top surface and a bottom surface, and can define an inlet port 900 and an outlet port 905 each through the top surface and the bottom surface. The inlet port 900 and the outlet port 905 can be at an offset distance relative to the first side wall 115.

The apparatus 100 can include a battery module 210. The battery module 210 can be disposed within the cavity 200 of the housing 110 for the battery pack 105, and can be support by at least a portion of the top surface of the bottom panel 205. The battery module 210 can include a set of battery cells to store electric energy. The apparatus can include a support structure 135. The support structure 135 can be situated on the second side wall 120 of the housing 110. The support structure can have an intake conduit 1000 to receive coolant from outside the housing 110 and an outtake conduit 1005 to release the coolant from within the housing 110. The intake conduit 1000 and the outtake conduit 1005 can each have a length less than a length of the second side wall 120.

The apparatus 100 can include a cold plate 310. The cold plate 310 can be disposed or arranged within the cavity 200 defined by the housing 110. The cold plate 310 can be mechanically coupled with the bottom panel 205 (e.g., using a fastening element, joint, or seal). The cold plate 310 can be thermally coupled with the battery module 210. The cold plate 310 can have an inlet 700 coupled with the inlet port 900 to receive the coolant from the intake conduit 1000. The cold plate 310 can have an outlet 705 coupled with the outlet port 905 to release the coolant onto the outtake conduit 1005. The cold plate 310 can have a channel 710. The channel 710 can span from the inlet 700 to the outlet 705 to circulate the coolant from the inlet 700 to the outlet 705 to transfer heat away from the battery module 210. The apparatus 100 can include a distribution plate 600. The distribution plate 600 can have an intake channel 1110 coupled with the intake conduit 1000 to convey the coolant to the cold plate 310 via the inlet 700 and the inlet port 900. The distribution plate 600 can have an outtake channel 1115 coupled with the outtake conduit 1005 to receive the coolant released from the cold plate 310 via the outlet 705 and the outlet port 905.

While operations may be depicted in the drawings or described in a particular order, such operations are not required to be performed in the particular order shown or described, or in sequential order, and all depicted or described operations are not required to be performed. Actions described herein can be performed in different orders.

Systems and methods described herein may be embodied in other specific forms without departing from the characteristics thereof. For example, descriptions of positive and negative electrical characteristics may be reversed. For example, elements described as negative elements can instead be configured as positive elements and elements described as positive elements can instead by configured as negative elements. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. Further, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. An apparatus to provide electric power to components in electric vehicles, comprising:
    a housing for a battery pack disposed in an electric vehicle to power the electric vehicle, the housing having a bottom panel, a first side wall, and a second wall partially defining a cavity within the housing;
    the bottom panel having a top surface and a bottom surface, the bottom panel defining an inlet port through the top surface and the bottom surface and an outlet port through the top surface and the bottom surface;
    the inlet port at an inlet port offset distance from the first side wall, the outlet port at an outlet port offset distance from the first side wall, the inlet port offset distance different from the outlet port offset distance;
    a battery module disposed within the cavity of the housing for the battery pack and supported by at least a portion of the top surface of the bottom panel, the battery module having a plurality of battery cells to store electric energy;
    a support structure situated on the second side wall, the support structure having a conduit to pass coolant through the housing, the conduit having a length less than a length of the second side wall on which the support structure is situated;
    a cold plate disposed within the cavity of the housing, mechanically coupled with the top surface of the bottom panel, and thermally coupled with the battery module, the cold plate having:
        a cold plate inlet coupled with the inlet port to receive the coolant from the conduit, the cold plate inlet at an inlet offset distance from the first side wall;
        a cold plate outlet coupled with the outlet port to release the coolant from the cold plate, the cold plate outlet at an outlet offset distance from the inlet from the first side wall, the inlet offset distance different from the outlet offset distance relative to the first side wall;
        a channel spanning through the cold plate to circulate the coolant from the cold plate inlet to the cold plate outlet to transfer heat away from the battery module; and a distribution plate disposed along the bottom surface of the bottom panel, having a main channel to convey the coolant from the conduit to the cold plate via the inlet port of the bottom panel and the cold plate inlet.

2. The apparatus of claim 1, comprising:
a plurality of battery modules including the battery module and a second battery module both disposed within the cavity of the housing of the battery pack;
a plurality of cold plates including the cold plate and a second cold plate arranged in parallel within the cavity of the housing, the second cold plate mechanically coupled with the top surface of the bottom panel and thermally coupled with the second battery pack to transfer heat away from the second battery pack; and
the main channel of the distribution plate to deliver the coolant from the conduit to both the cold plate and the second cold plate in parallel.

3. The apparatus of claim 1, comprising:
a plurality of battery modules including the battery module and a second battery module both disposed within the cavity of the housing of the battery pack;
a plurality of cold plates including the cold plate and a second cold plate arranged in parallel within the cavity of the housing, the second cold plate mechanically coupled with the top surface of the bottom panel and thermally coupled with the second battery pack to transfer heat away from the second battery pack; and
an internal divider disposed within the housing, supported by the top surface of the bottom panel, extending between the first side wall and a third side wall of the housing to divide the cavity into a first portion and a second portion, and arranged between a lateral surface of the battery module and a side surface of the second battery module opposite of the lateral surface of the battery module to define a first portion of the cavity to hold the battery module and a second portion of the cavity to hold the second battery module.

4. The apparatus of claim 1, comprising:
a plurality of battery modules including the battery module and a second battery module both disposed within the cavity of the housing of the battery pack; and
the bottom panel having an extrusion structure to divide the cavity into a first portion to hold the battery module and a second portion to hold the second battery module, the extrusion arranged between a lateral surface of the battery module and a side surface of the second battery module opposite of the lateral surface of the battery module.

5. The apparatus of claim 1, comprising:
the conduit of the support structure situated on the second side wall, having:
an intake conduit coupled with to the main channel of the distribution plate to convey the coolant from outside the housing to the cold plate, the intake conduit having a length less than the length of the second side wall; and
an outtake conduit coupled with the main channel of the distribution plate to release the coolant from the cold plate of the housing, the outtake conduit having a length less than the length of the second side wall.

6. The apparatus of claim 1, comprising:
the main channel of the distribution plate having:
an intake channel coupled with the conduit of the support structure to convey the coolant from outside the housing to the cold plate via the inlet port of the bottom panel and the cold plate inlet, the intake channel extending across the distribution plate; and
an outtake channel coupled with the conduit of the support structure to release the coolant from the cold plate via the cold plate outlet and the outlet port of the bottom panel, the outlet main channel extending across the distribution plate, at least a portion of the outtake channel substantially parallel with at least a portion of the intake channel.

7. The apparatus of claim 1, comprising:
the cold plate having four edges to define a perimeter of the cold plate, the channel spanning from the cold plate inlet along at least three of the four edges of the perimeter of the cold plate and terminating at the cold plate outlet to circulate the coolant.

8. The apparatus of claim 1, comprising:
the cold plate defining a hollow path for the channel through an interior of the cold plate to convey the coolant from the cold plate inlet through the hollow path to the cold plate outlet to transfer heat away from the battery pack.

9. The apparatus of claim 1, comprising:
the channel having a plurality of segments having a first segment and a second segment spanning through the cold plate, one end of the first segment connected with one end of the second segment.

10. The apparatus of claim 1, comprising:
the distribution plate having a top surface, the top surface having an inner portion and an outer portion, the inner portion defining the main channel across the top surface, the outer portion mechanically sealed with at least a portion of the bottom surface of the bottom panel to enclose the main channel.

11. The apparatus of claim 1, comprising:
the cold plate inlet aligned with the inlet port and coupled with the inlet port and at least a portion of top surface of the bottom panel via a mechanical coupling; and
the cold plate outlet aligned with the outlet port and coupled with the outlet port and at least a portion of top surface of the bottom panel via a mechanical coupling.

12. The apparatus of claim 1, comprising:
the cold plate defining a hole to mechanically couple the cold plate to the housing via a fastening element through the hole.

13. The apparatus of claim 1, comprising:
the bottom panel of the housing, comprising:
a bottom ridge panel extending from the second side wall to a third side wall of the housing to define an opening between the bottom panel and the first side wall, the second side wall opposite of the third side wall; and
a bottom cover plate to cover the opening defined between the bottom panel and the first side wall, at least a portion of the bottom panel mechanically coupled with the cold plate.

14. The apparatus of claim 1, comprising:
a lid structure situated on the housing to cover the cavity to hold the battery pack within the cavity partially defined by the bottom panel, the first side wall, and the second side wall of the housing.

15. An electric vehicle, comprising:
one or more components;
a housing for a battery pack to power the one or more component, the housing having a bottom panel, a first side wall, and a second wall partially defining a cavity within the housing, the bottom panel having a top surface and a bottom surface, the bottom panel defining an inlet port and an outlet port each through the top surface and the bottom surface, the inlet port at an inlet port offset distance from the first side wall, the outlet port at an outlet port offset distance from the first side wall, the inlet port offset distance different from the outlet port offset distance relative to the first side wall;

a battery module disposed within the cavity of the housing for the battery pack and supported by at least a portion of the top surface of the bottom panel, the battery module having a plurality of battery cells to store electric energy;

a support structure situated on the second side wall, the support structure having a conduit to pass coolant through the housing, the conduit having a length less than a length of the second side wall on which the support structure is situated;

a cold plate disposed within the cavity of the housing, mechanically coupled with the top surface of the bottom panel, and thermally coupled with the battery module, the cold plate having:
- a cold plate inlet coupled with the inlet port to receive the coolant from the conduit, the cold plate inlet at an inlet offset distance from the first side wall;
- a cold plate outlet coupled with the outlet port to release the coolant from the cold plate, the cold plate outlet at an outlet offset distance from the first side wall, the inlet offset distance different from the outlet offset distance relative to the first side wall;
- a channel spanning through the cold plate to circulate the coolant from the cold plate inlet to the cold plate outlet to transfer heat away from the battery module; and a distribution plate disposed along the bottom surface of the bottom panel, having a main channel to convey the coolant from the conduit to the cold plate via the inlet port of the bottom panel and the cold plate inlet.

16. The electric vehicle of claim 15, comprising:
a plurality of battery modules including the battery module and a second battery module both disposed within the cavity of the housing of the battery pack;
a plurality of cold plates including the cold plate and a second cold plate arranged in parallel within the cavity of the housing, the second cold plate mechanically coupled with the top surface of the bottom panel and thermally coupled with the second battery pack to transfer heat away from the second battery pack; and
the main channel of the distribution plate to deliver the coolant from the conduit to both the cold plate and the second cold plate in parallel.

17. The electric vehicle of claim 15, comprising:
the conduit of the support structure situated on the second side wall, having:
- an intake conduit coupled with to the main channel of the distribution plate to convey the coolant from outside the housing to the cold plate, the intake conduit having a length less than the length of the second side wall; and
- an outtake conduit coupled with the main channel of the distribution plate to release the coolant from the cold plate of the housing, the outtake conduit having a length less than the length of the second side wall.

18. A method of providing electric power to components in electric vehicles, comprising:
disposing a housing for a battery pack disposed in an electric vehicle to power the electric vehicle, the housing having a bottom panel, a first side wall, and a second wall partially defining a cavity within the housing, the bottom panel having a top surface and a bottom surface, the bottom panel defining an inlet port and an outlet port each through the top surface and the bottom surface, the inlet port at an inlet port offset distance from the first side wall, the outlet port at an outlet port offset distance from the first side wall, the inlet port offset distance different from the outlet port offset distance relative to the first side wall;

arranging a battery module within the cavity of the housing for the battery pack, the battery module supported by at least a portion of the top surface of the bottom panel, the battery module having a plurality of battery cells to store electric energy;

situating a support structure on the second wall, the support structure having a conduit to pass coolant through the housing, the conduit having a length less than a length of the second side wall on which the support structure is situated disposing a cold plate within the cavity of the housing, the cold plate mechanically coupled with the top surface of the bottom panel and thermally coupled with the battery module, the cold plate having:
- a cold plate inlet coupled with the inlet port to receive the coolant from the conduit, the cold plate inlet at an inlet offset distance from the first side wall;
- a cold plate outlet coupled with the outlet port to release the coolant from the cold plate, the cold plate outlet at an outlet offset distance from the first side wall, the inlet offset distance different from the outlet offset distance relative to the first side wall;
- a channel spanning through the cold plate to circulate the coolant from the cold plate inlet to the cold plate outlet to transfer heat away from the battery module; and arranging a distribution plate along the bottom surface of the bottom panel, the distribution plate having a main channel to convey the coolant from the conduit to the cold plate via the inlet port of the bottom panel and the cold plate inlet.

19. The method of claim 18, comprising:
arranging a plurality of battery modules including the battery module and a second battery module both disposed within the cavity of the housing of the battery pack;
disposing a plurality of cold plates including the cold plate and a second cold plate arranged in parallel within the cavity of the housing, the second cold plate mechanically coupled with the top surface of the bottom panel and thermally coupled with the second battery pack to transfer heat away from the second battery pack; and
the main channel of the distribution plate to deliver the coolant from the conduit to both the cold plate and the second cold plate in parallel.

20. The method of claim 18, comprising:
situating the support structure on the second side wall, the conduit of the support structure situated on the second side wall, having:
- an intake conduit coupled with to the main channel of the distribution plate to convey the coolant from outside the housing to the cold plate, the intake conduit having a length less than the length of the second side wall; and
- an outtake conduit coupled with the main channel of the distribution plate to release the coolant from the cold plate of the housing, the outtake conduit having a length less than the length of the second side wall.

* * * * *